United States Patent [19]

Paterson et al.

[11] Patent Number: 6,069,629
[45] Date of Patent: *May 30, 2000

[54] METHOD OF PROVIDING ACCESS TO OBJECT PARAMETERS WITHIN A SIMULATION MODEL

[75] Inventors: Thomas S. Paterson, Redwood City; Alex L. Bangs, La Honda, both of Calif.

[73] Assignee: Entelos, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/979,270

[22] Filed: Nov. 25, 1997

[51] Int. Cl.$^7$ ............................... G06F 3/14; G06F 13/00
[52] U.S. Cl. ......................... 345/349; 345/356; 345/347; 345/970; 395/500.27; 395/500.32
[58] Field of Search .................................... 345/353, 356, 345/357, 970, 349, 965, 967, 347, 975; 364/578, 188

[56] References Cited

U.S. PATENT DOCUMENTS

| | | | |
|---|---|---|---|
| 3,800,288 | 3/1974 | Russell et al. | 340/172.5 |
| 4,873,623 | 10/1989 | Lane et al. | 364/188 |
| 4,881,175 | 11/1989 | Ladner | 364/496 |
| 5,005,143 | 4/1991 | Altschuler et al. | 364/554 |
| 5,081,584 | 1/1992 | Omichinski et al. | 364/497 |
| 5,307,287 | 4/1994 | Cramer, III et al. | 364/496 |
| 5,331,573 | 7/1994 | Balaji et al. | 364/500 |
| 5,418,944 | 5/1995 | DiPace et al. | 395/500 |
| 5,424,963 | 6/1995 | Turner et al. | 364/578 |
| 5,434,796 | 7/1995 | Weininger | 364/496 |
| 5,463,564 | 10/1995 | Agrafiotis et al. | 364/496 |
| 5,481,741 | 1/1996 | McKaskie et al. | 395/800 |
| 5,495,423 | 2/1996 | DeLisi et al. | 364/496 |
| 5,526,281 | 6/1996 | Chapman et al. | 364/496 |
| 5,544,067 | 8/1996 | Rostoker et al. | 364/489 |
| 5,555,201 | 9/1996 | Dangelo et al. | 364/489 |
| 5,566,295 | 10/1996 | Cypher et al. | 345/326 |
| 5,623,418 | 4/1997 | Rostoker et al. | 364/489 |
| 5,657,255 | 8/1997 | Fink et al. | 364/578 |
| 5,680,590 | 10/1997 | Parti | 395/500.23 |
| 5,715,413 | 2/1998 | Ishai et al. | 345/349 |
| 5,729,466 | 3/1998 | Bamji | 364/488 |
| 5,737,727 | 4/1998 | Lehmann et al. | 705/7 |
| 5,757,678 | 5/1998 | Leeke | 364/578 |
| 5,808,918 | 9/1998 | Fink et al. | 364/578 |
| 5,845,124 | 12/1998 | Berman | 395/500 |
| 5,872,957 | 2/1999 | Worthington et al. | 395/500 |

FOREIGN PATENT DOCUMENTS

| | | | |
|---|---|---|---|
| 0 483 040 A2 | 4/1992 | European Pat. Off. | G06F 9/44 |
| 0 587 519 A1 | 3/1994 | European Pat. Off. | G06F 3/023 |

OTHER PUBLICATIONS

Karp, P.D. and Freidland, P., "Coordinating the Use of Qualitative and Quantitative Knowledge in Declarative Device Modeling", *Artificial Intelligence, Simulation and Modeling*, Chapter 7–8, pp 189–207.

(List continued on next page.)

*Primary Examiner*—Raymond J. Bayerl
*Assistant Examiner*—Cuong T. Thai
*Attorney, Agent, or Firm*—Blakely, Sokoloff, Taylor & Zafman

[57] ABSTRACT

A method of providing access to object parameters of a simulation model involves the display of a diagram panel within a user interface, this diagram panel including icons representative of objects modeled within the simulation model. An access panel is also displayed within the user interface, this access panel being distinct and apart from the diagram panel. A set of object parameters, in terms of which objects within the simulation model may be defined, are identified for inclusion and display within the access panel. In response to identification of the set of object parameters, an identifier for each parameter of the set is displayed within the access panel. A value for at least one of the object parameters is then inputted by a user via the access panel, and this inputted value is then assigned to the relevant parameter.

25 Claims, 27 Drawing Sheets

OTHER PUBLICATIONS

Patil, R.S., Szolovits, P. and Schwartz, W.B., "Casual Understanding of Patient Illness in Medical Diagnosis", *IJCAI*, pp 893–899, 1981.

Davis, R., "Reasoning from first principles in electronic troubleshooting", *International Journal of Man–Machine Studies*, vol. 19, pp 403–423, 1983.

"Editorial: Developments in Expert Systems", *International Journal of Man–Machine Studies*, vol. 19, pp 399–402, 1983.

DeKleer, J. and Brown, J.S., "A Qualitative Physics Based on Confluences", *Artificial Intelligence*, vol. 24, pp 7–83, 1984.

Forbus, K.D., "Qualitative Process Theory", *Artificial Intelligence*, vol. 23, pp. 85–168, 1984.

Kuipers, B., "Qualitative Process Theory", *Artificial Intelligence*, vol. 29, pp. 289–388, 1986.

Fink, P.K. and Lusth, J.C., "Expert Systems and Diagnostic Expertise in the Mechanical and Electrical Domains", *IEEE Transactions on Systems, Man and Cybernetics*, vol. SMC–17, No. 3, pp. 340–349, May/Jun., 1987.

Fishwick, P.A., "A Study of Terminology and Issues in Qualitative Simulation", Department of Computer and Information Sciences, University of Florida, pp. 5–9, Jan. 1989.

Fishwick, P.A., "Qualitative methodology in simulation model engineering", *Simulation* vol. 52, No. 3, pp. 95–101, Mar. 1989.

Clancey, W.J., "Viewing Knowledge Bases as Qualitative Models", *IEEE Expert, Tools and Techniques*, pp. 9–23, Summer 1989.

Barr, A., Cohen, P.R. and Feigenbaum, E.A., "Knowledge–based Simulation, Alfred Round–Intelligent Interfaces", *The Handbook of Artificial Intelligence*, vol., 4, Chapter 22, pp. 7–15, Dec. 1989.

Weld, D.S. and de Kleer, J., "Readings in Qualitative Reasoning About Physical Systems", pp. 1–10, 1990.

Cellier, F.E., "Qualitative Modeling and Simulation: Promise or Illusion", *Proceedings of the 1991 Winter Simulation Conference*, pp. 1086–1090, 1991.

Celada, F. and Seiden, P.E., "A computer model of cellular interactions in the immune system", *Immunology Today*, vol. 13, No. 2, pp. 56–62, 1992.

Hamscher, W., Console, L. and de Kleer, J., "Readings in Model–based diagnosis", Chapter 1, pp. 1–2, 1992.

Uckun, W., "Model–Based Reasoning In Biomedicine", *Critical Reviews in Biomedical Engineering*, vol. 19(4), pp. 261–292, 1992.

Conolly, R.B. and Kimbell, J.S., "Computer Simulation of Cell Growth Governed by Stochastic Processes: Application to Clonal Growth Cancer Models", *Toxicology and Applied Pharmacology*, vol. 124, pp. 284–295, 1994.

Aliev, M.K., and Saks, V.A., "Mathematical modeling of intercellular transport processes and the creatine kinase systems: a probability approach", [Review], *Molecular & Cellular Biochemistry*, vol. 133–124, pp. 333–346, Apr.–May, 1994.

Sieburg, H.B., "Methods in the Virtual Wetlab I: Rulebased reasoning driven by nearest–neighbor lattice dynamics", *Artificial Intelligence in Medicine*, vol. 6, No. 4, pp. 301–319, Aug. 1994.

Pedley, T.J., Corieri, P., Kamm, R.D., Grotberg, J.B. Hydon, P.E. and Schroter, R.C., "Gas flow and mixing in the airways", *Critical Care Medicine*, vol. 22, No. 9, pp. S24–S36, Sep. 1994.

Sieburg, H.B. and Muller–Sieburg, C., "The CyberMensch Simulation Server for the Planning of Clinical Trials", *Interactive Technology and New Paradigm for Healthcare*, Chapter 65, pp. 445–454, 1995.

Hoang, K.T., "Physiologically based pharmacokinetic models: mathematical fundamentals and simulation implementations", *Toxicology Letters*, vol. 79, pp. 99–106, Sep. 1995.

Sieburg, H.B., "In Silico Environments Augment Clinical Trials", *IEEE Engineering in Medicine and Biology*, vol. 15, No. 2, pp. 47–59,Mar./Apr., 1996.

Conolly, R.B. and Andersen, M.E., "Biologically Based Pharmacodynamic Models: Tools for Toxicological Research and Risk Assessment", *Annual Review of Pharmacology and Toxicology*, vol. 31, pp. 503–523, 1991.

Berger, M.P., Gelfand , R.A. and Miller, P.L., "Combining Statistical Rule–Based and Physiologic Model–Based Methods to Assist in the Management of Diabetes Mellitus", *Computers and Biomedical Research*, pp. 356–357, 1990.

Dijkstra, J., Neal, H.D.St.C., Beever, D.E. and France, J., "Simulation of Nutrient Digestion, Absorption and Outflow in the Rumen: Model Description", *The Journal of Nutrition*, vol. 122, No. 11, pp. 2239–2256, Nov. 1992.

Dong, M.H., "Microcomputer programs for physiologically–based pharmacokinetic (PB–PK) modeling", *Computer Methods and Programs in Biomedicine*, vol. 45, No. 3, pp. 213–221, Dec. 1994.

Keller, F., Frankewitsch, T., Zellner, D., Simon, S, Czock, D. and Giehl, M., "Standardized structure and modular design of a pharmacokinetic database", *Computer Methods and Programs in Biomedicine*, pp. 107–115, 1998.

"A Flexible Graphical User Interface for Performance Modeling", Yi–Bing Lin and Dan Daly, *Software Practice & Experience*, vol. 25,No. 2, Feb. 1995, pps 193–216.

"IDF: A Graphical Data Flow Programming Language for Image Processing and Computer Vision", Neil Hunt, *Proceedings of the International Conference on Systems, Man and Cybernetics*, Nov. 4, 1990, pps 351–360.

"User Interface to Support Multiple Actions Within a Connection", *IBM Technical Disclosure Bulletin*, vol. 37 No. 7, Jul. 1, 1994, p. 379.

*ithink The Visual Thinking Tool for the 90's, Introduction to Systems Thinking and ithink*, High Performance Systems, Inc., pps 152–154.

*ithink The Visual Thinking Tool for the 90's, Introduction to Systems Thinking and ithink*, High Performance Systems, Inc., Chapter 2 Stocks & Flows, Infrastructures and Feedback, Loops, pps 2–25 to 2–38.

*ithink The Visual Thinking Tool for the 90's, Introduction to Systems Thinking and ithink*, High Performance Systems, Inc., Chapter 3 Basic Building Blocks, pps 39–64.

*ithink The Visual Thinking Tool for the 90's , Technical Reference*, High Performance Systems, Inc., Chapter 4 Building Blocks pps 4–1 to 4–36.

*Powersim 2.5,, User's Guide*, Powersim Corporation, 1996, Chapter 5 Using Powersim Objects, pp. 79–98.

*Powersim 2.5, Reference Manual*, Powersim Corporation, 1996, Chapter 1 Objects, pp. 1–1 to 1–41.

*Extend, Performance modeling for decision support, User's Manual*, Imagine That, Inc., 1994, Appendix E Generic Library Blocks, pps 361–403.

*Extend, Performance modeling for decision support, User's Manual*, Imagine That, Inc., 1994, Chapter 6 Input and Output, pps 113–132.

*Extend, Performance modeling for decision support, User's Manual*, Imagine That, Inc., 1994, Chapter 4 Using the Generic and Discrete Event Libraries, pps 69–102.

*Extend, Performance modeling for decision support, User's Manual*, Imagine That, Inc., 1994, Chapter 1 Running a Model, pps 11–24.

*Extend, Performance modeling for decision support, User's Manual*, Imagine That, Inc., 1994, Chapter 2 Building a Model, pps 113–132.

Parameter

Definition
Symbol      C
Definition     coefficient

Units
Assessed     hours      Internal     hours − 1
○ Multiplicative Conversion    hours − 1 = K/hours
● Reciprocal Conversion      where K = 0.693147

Settings

| | hours | Description |
|---|---|---|
| Working | 2.0 | slower |
| Baseline | 3.0 | nominal |
| Comparison | 1.0 | |

Range

| | hours | Description |
|---|---|---|
| Low | 1.0 | fastest observed |
| High | 5.0 | slowest observed |

Cancel    OK

FIG. 5

WOLVES (LAYER)

| OBJECT | SYMBOL | LAYER VALUE | UNITS |
|---|---|---|---|
| ◯ ADULT PREDATORS | H | 240 | MONTHS |
| ⊸ PREDATOR REPRODUCTION | C | 0.5 | PREDATORS/MO. |
| ⊸ PREDATOR MATURATION | C | 14 | MONTHS |
| ⊸ FOOD SUPPLY REG. OF PREDATOR SENSITIVITY | | 0.2 | FRACTION |
| ⊸ FOOD SUPPLY REG. OF PREDATOR SATURATION | | 0.8 | FRACTION |

COYOTES (LAYER)

| OBJECT | SYMBOL | LAYER VALUE | UNITS |
|---|---|---|---|
| ◯ ADULT PREDATORS | H | 180 | MONTHS |
| ⊸ PREDATOR REPRODUCTION | C | 0.75 | PREDATORS/MO. |
| ⊸ PREDATOR MATURATION | C | 9 | MONTHS |
| ⊸ FOOD SUPPLY REG. OF PREDATOR SENSITIVITY | | 0.1 | FRACTION |
| ⊸ FOOD SUPPLY REG. OF PREDATOR SATURATION | | 0.6 | FRACTION |

FIG. 16

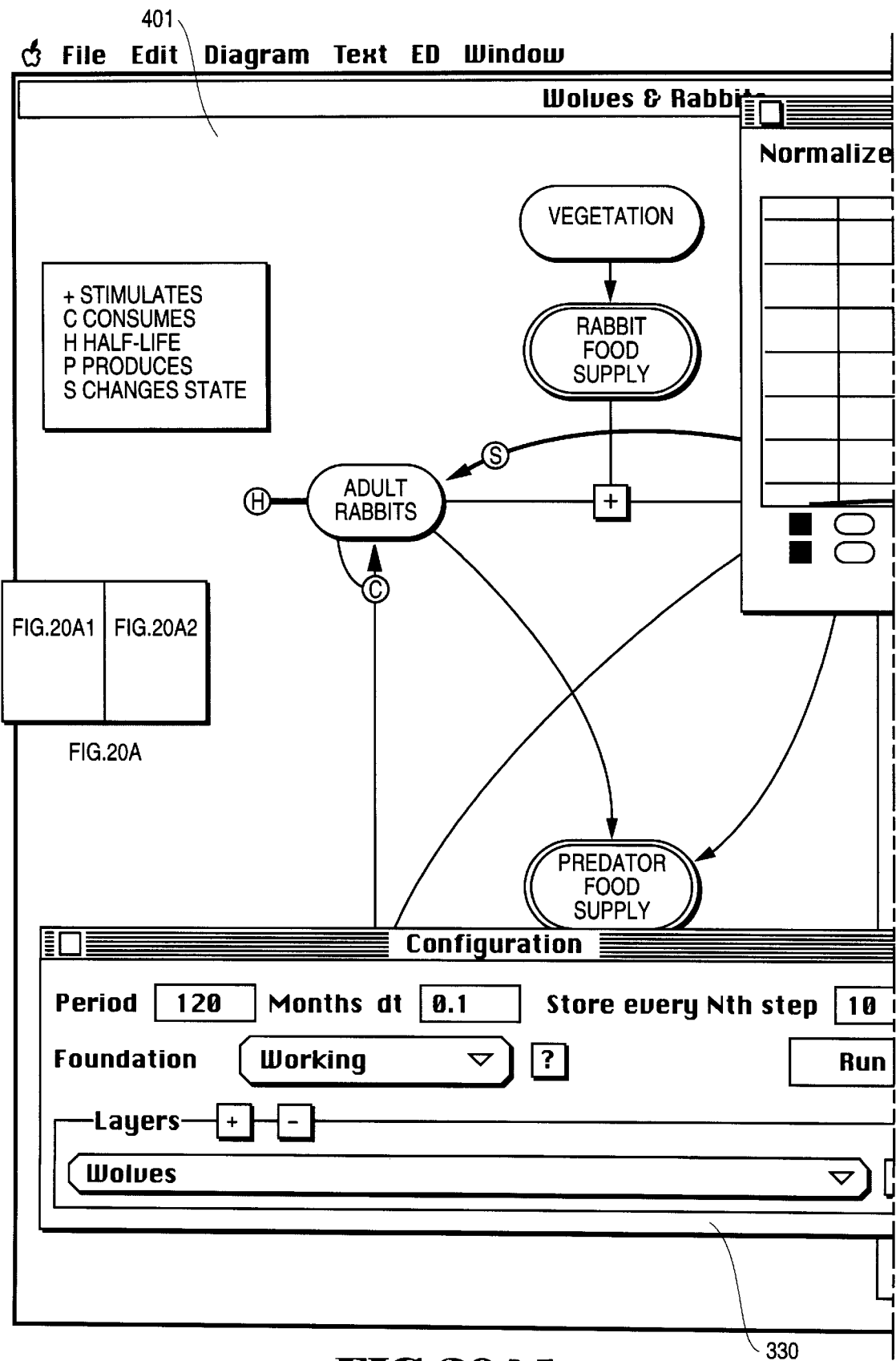
FIG.20A1

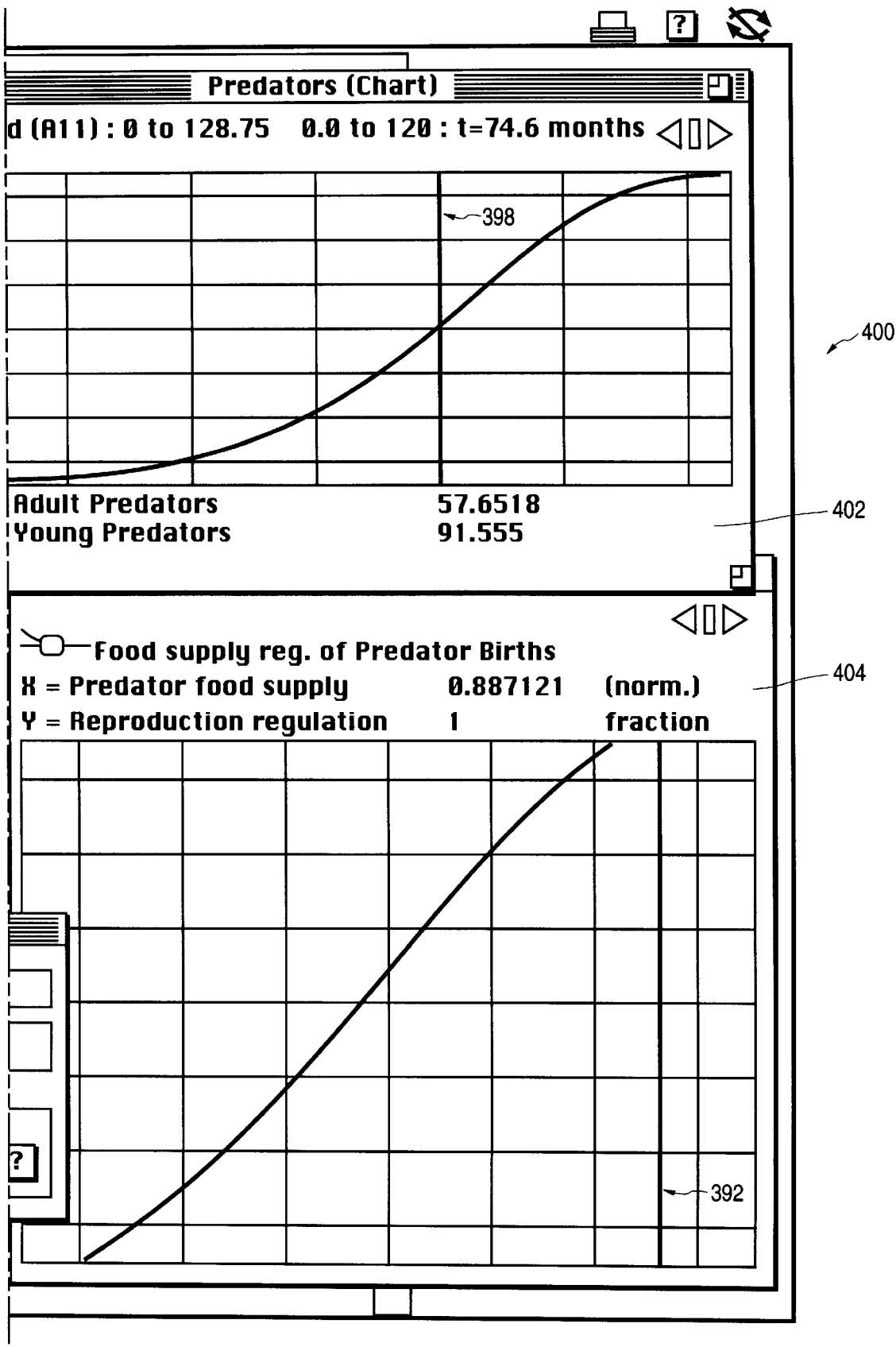
FIG.20A2

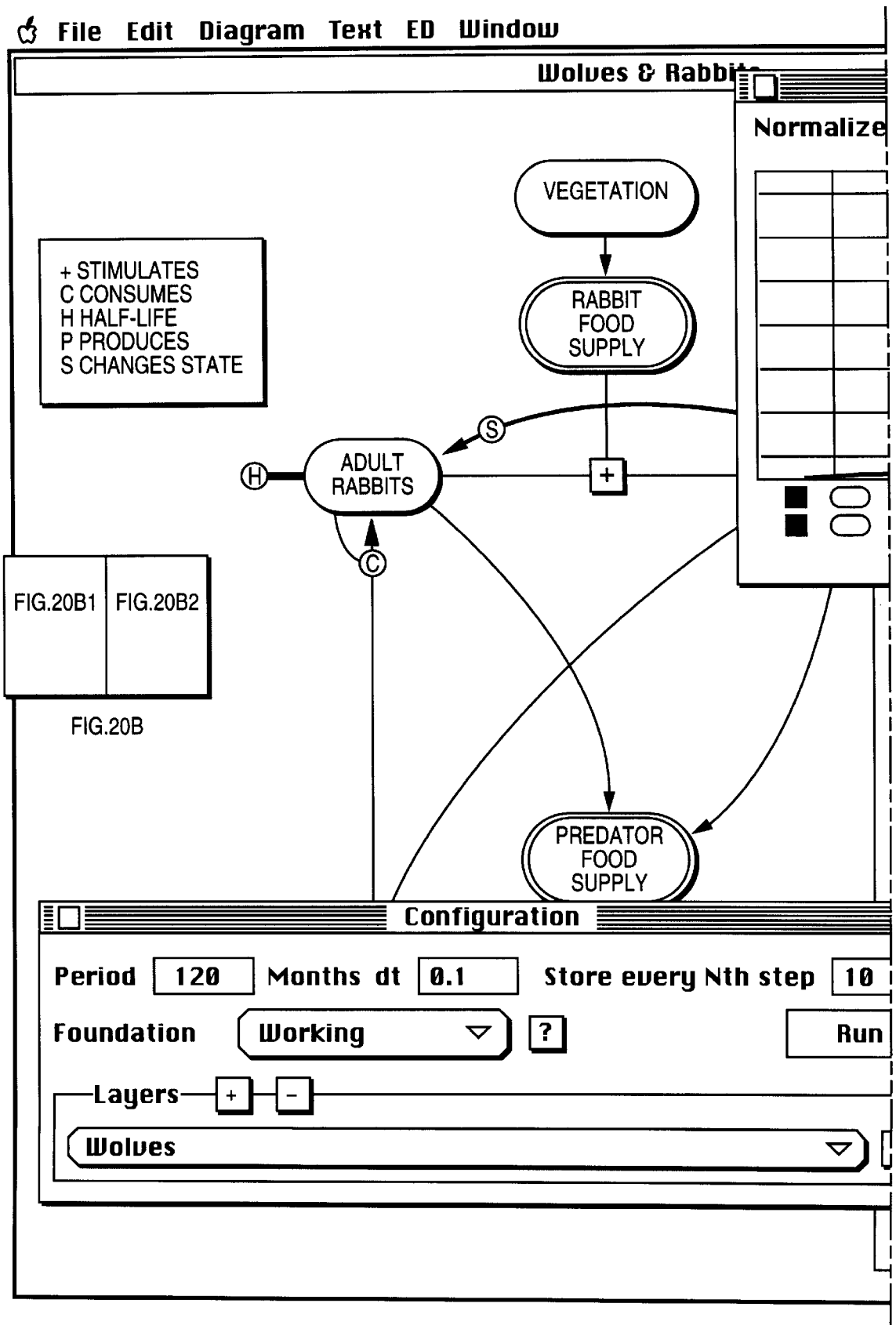
FIG.20B1

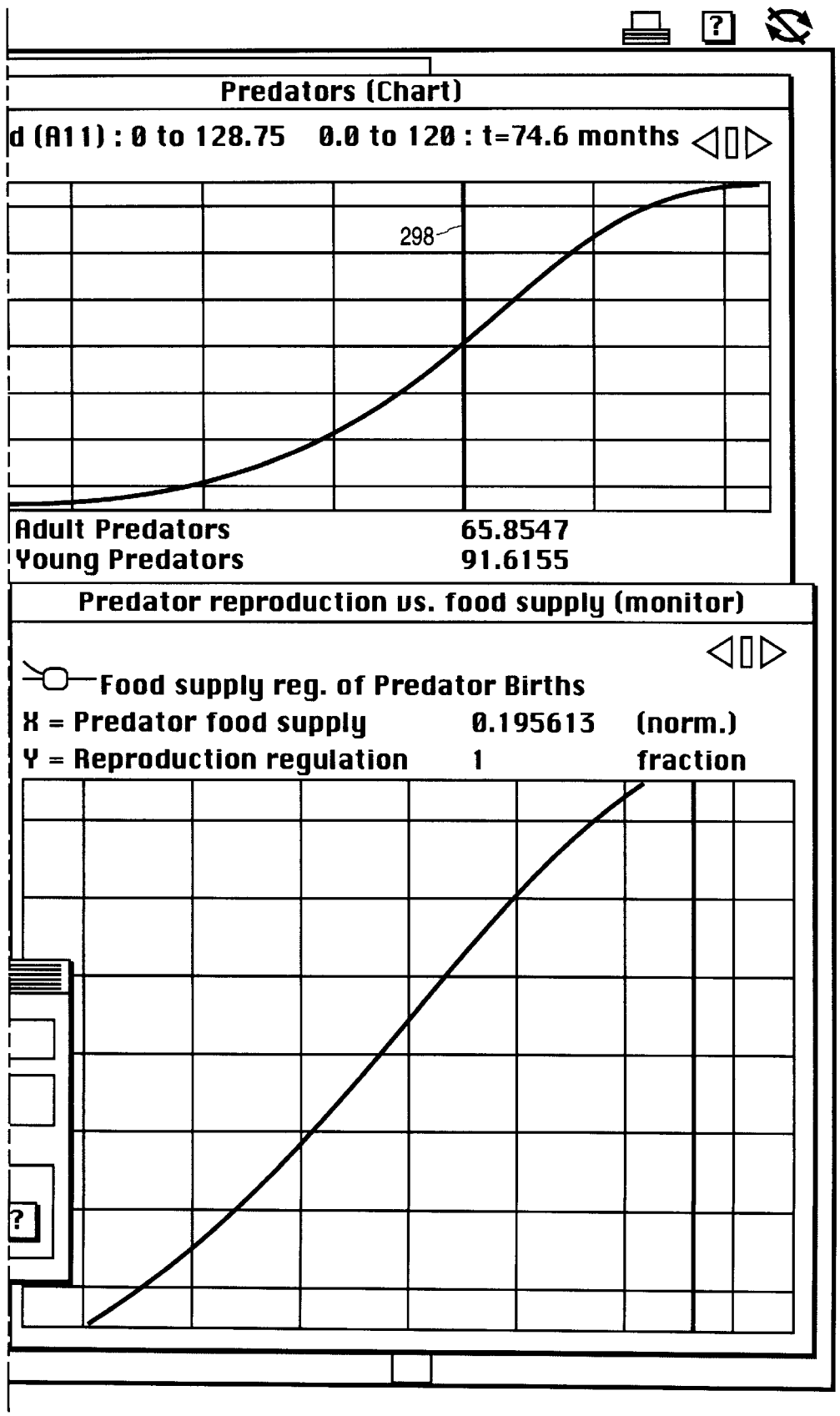
FIG. 20B2

METHOD OF PROVIDING ACCESS TO OBJECT PARAMETERS WITHIN A SIMULATION MODEL

FIELD OF THE INVENTION

The present invention pertains generally to the field of simulation modeling. More specifically, the present invention relates to methods of representing, accessing, inputting and monitoring parameters of objects within a simulation model.

BACKGROUND OF THE INVENTION

Simulation modeling is commonly used to model systems to perform "what-if" analyses to optimize system performance and to identify problems within systems. Graphical simulation modeling allows a complex system to be modeled in an intuitive and visually comprehensible manner, and has found application in wide range of fields, from business to biological analysis.

The construction of a simulation model typically involves identifying various objects within the system, which are then represented by variables, equations or both embodied in an "object". A simulation model may be constructed using a graphical user interface (GUI) in which the various objects are represented by user-selected icons or other appropriate graphical representations, and in which the inter-relationships between the objects are represented by links.

A simplified representation of a typical prior art graphical user interface (GUI) for a graphical simulation model is shown FIG. 1. Specifically, the prior art GUI of FIG. 1 includes a diagram window 10, within which are displayed node representations for various objects of a modeled system. Each of the various objects of the modeled system is shown to be either an entity object 12, an input object 14 or a link object 16. Each of the objects typically includes at least one parameter which has a parameter name, an assigned value and parameter documentation which describes the parameter.

Known simulation modeling tools include the Process Charter from Scitor Corporation of Menlo Park, Calif.; PowerSim from Modell Data AS in Bergen, Norway (http://www.powersim.com); Ithink and Stella from High Performance Systems Incorporated of Hanover, N.H. (http://hps-inc.com); and Extend +BPR from Imagine That! Incorporated of San Jose, Calif. (http://www.imaginethatinc.com). FIG. 2 illustrates a simulation model 30 as generated utilizing the Ithink product from High Performance Systems, Inc. The simulation model represents a work-in/work-out system within a business. The simulation model 30 is shown to include an object 32 that represents "work backlog", the object 32 being fed by arriving work orders 34 and depleted by filled work orders 36. The rate at which work orders are fed to the backlog object 32 is determined by an object 39, which functions as a "valve" with respect to a pipe by which work orders are fed to the object 32. Similarly, the rate at which work orders are dispensed from the object 32 is dependent upon an object 38 which functions as a "valve" for the pipe by which work orders are dispensed from the object 32. The object 38 is shown to receive as inputs the number of workers within the system, as represented by object 42, and the weekly productivity of each of these workers, as represented by the input parameter 40. The weekly productivity of the workers is further a function of hours per week per worker, represented by object 44. The production per hour worked, represented by object 46, is further shown to influence the weekly productivity per worker. Productivity per hour worked is in turn influenced by an average burnout factor, which is represented by an object 48. Various other factors are shown to influence the object 48.

While the simulation model 30 shown in FIG. 2 provides a satisfactory representation of the work-in/work-out system, the model 30 suffers from a number of inefficiencies. Specifically, the mathematical structure underlying the model 30 is not readily apparent from a viewing of the icons, and can only be guessed at as a result of the labels which are attached to the various nodes shown in the simulation model 30. Further, the numerous icons that are used to represent objects, inputs, pipes and links (as well as the labels associated with each of these icons) result in a cumbersome and cluttered depiction of the modeled system. The input and observation of parameter values associated with objects of the models of the FIGS. 1 and 2 is further tedious as a window must be generated for each variable of each object, and a specific value then entered or viewed in a field within the window. In large simulation models, which may have hundreds or even thousands of objects included therein, this process of inputting and viewing values for parameters becomes inconvenient.

SUMMARY OF THE INVENTION

According to the invention, there is provided a method of providing access to object parameters of a simulation model. A diagram panel is displayed within a user interface. The diagram panel includes graphical representations for objects of the simulation model. An access panel is also displayed within the user interface, the access panel being distinct from the diagram panel. A set of object parameters of the simulation model are identified for inclusion within the access panel. In response to the identification of the set of object parameters, an identifier for each parameter of the set of object parameters is displayed within the access panel. A value for at least one parameter of the set of object parameters is then received via the access panel. This value is then assigned to the relevant parameter.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 5 illustrates a parameter window which allows a user to view and input information pertaining to a parameter of a simulation model according to one embodiment of the present invention.

FIG. 16 illustrates two exemplary layer panels, according to one embodiment of the invention, which may be utilized to specify values to be included within a layer object.

FIGS. 20a and 20b illustrate GUIs which each display a diagram window, a chart panel, a monitor panel and a configuration panel.

DETAILED DESCRIPTION

A method of providing access to object parameters of a simulation model is described. In the following description, for the purposes of explanation, numerous specific details are set forth in order to provide a thorough understanding of the present invention. It will be evident, however, to one skilled in the art that the present invention may be practiced without these specific details.

Figure 1:
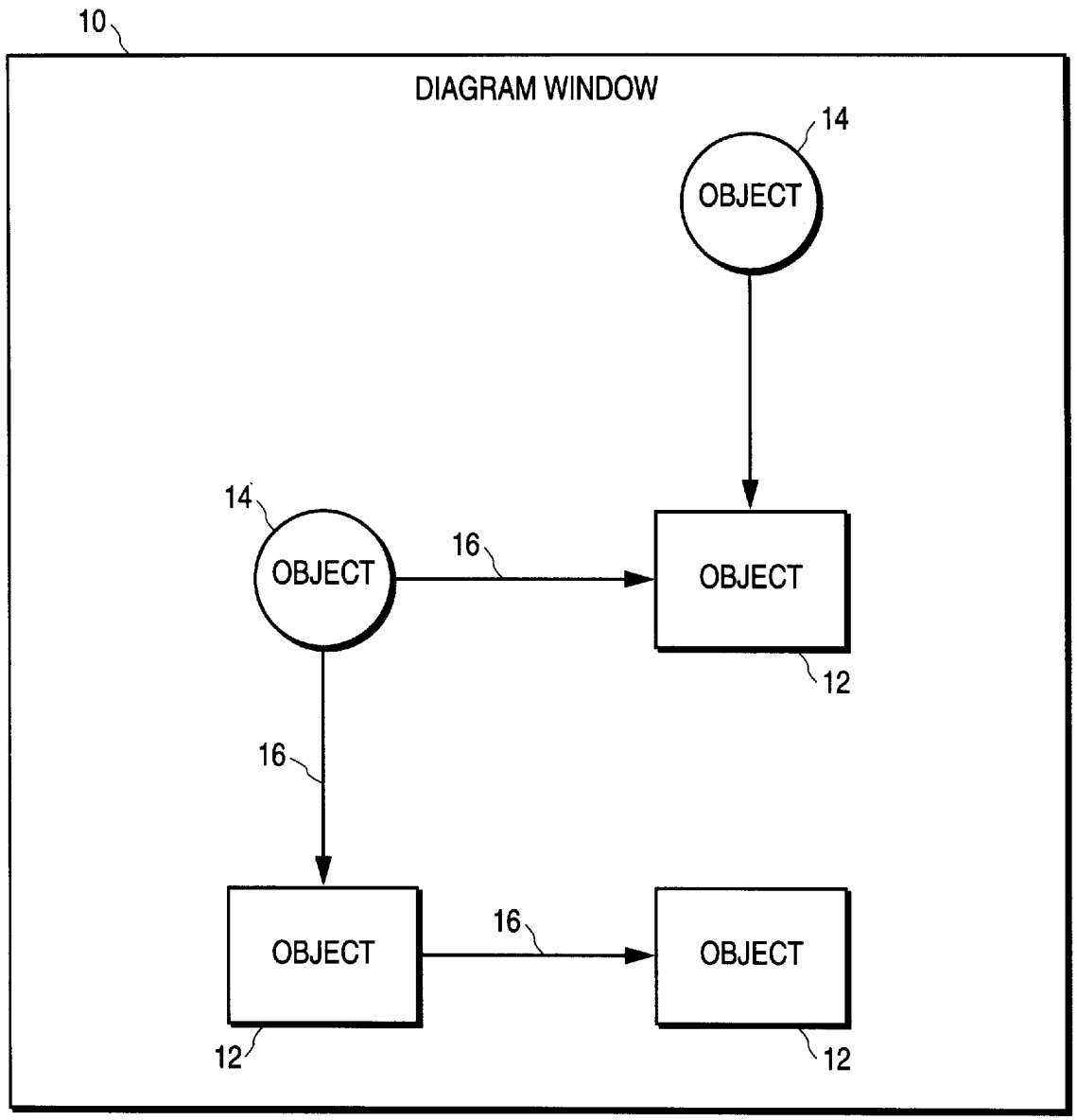
FIG. 1 illustrates a graphical user interface (GUI) utilized in the prior art to generate a display for a simulation model.
Figure 2:
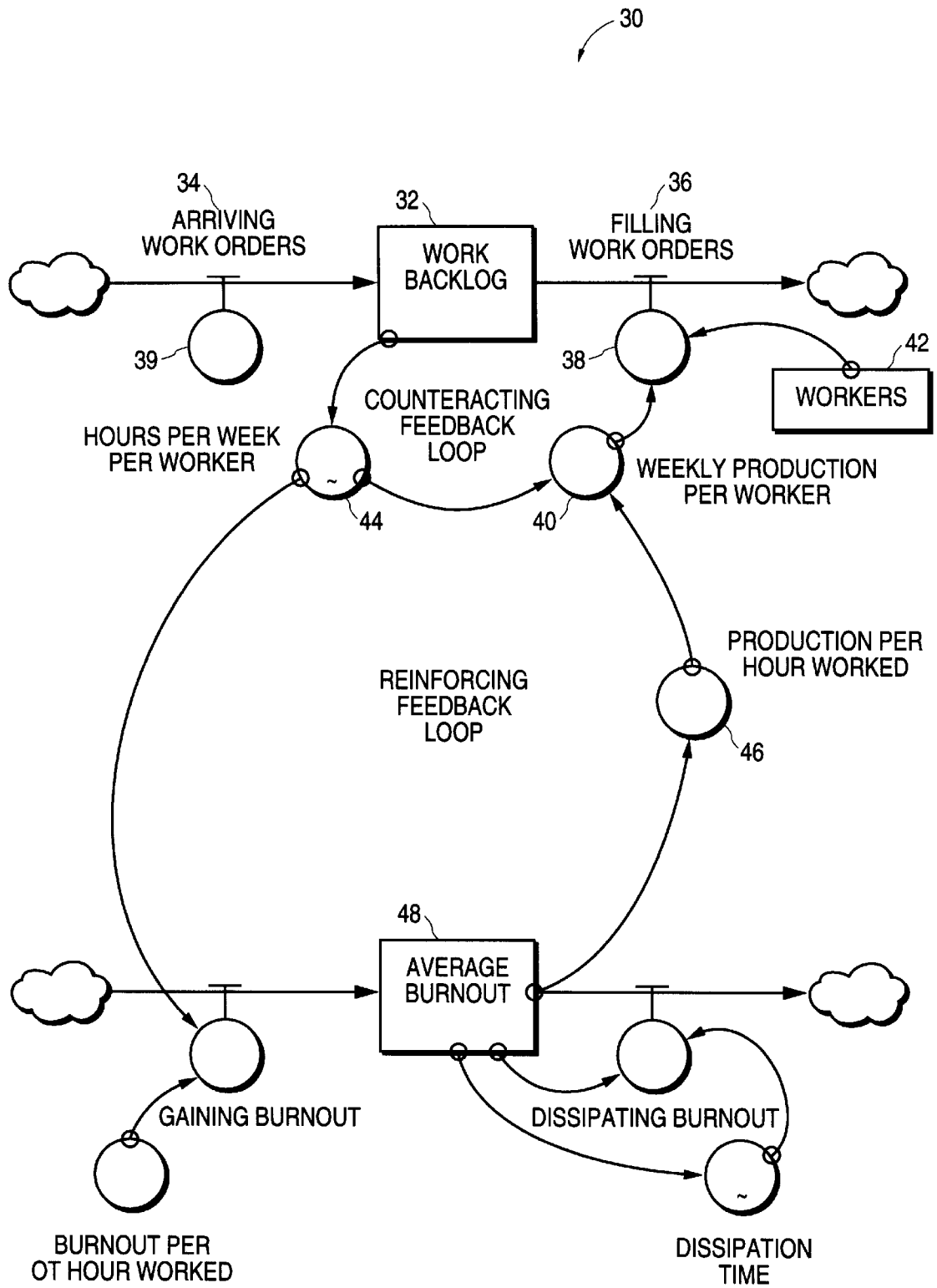
FIG. 2 illustrates a representation of a simulation model generated using a prior art modeling tool.
Figure 3:
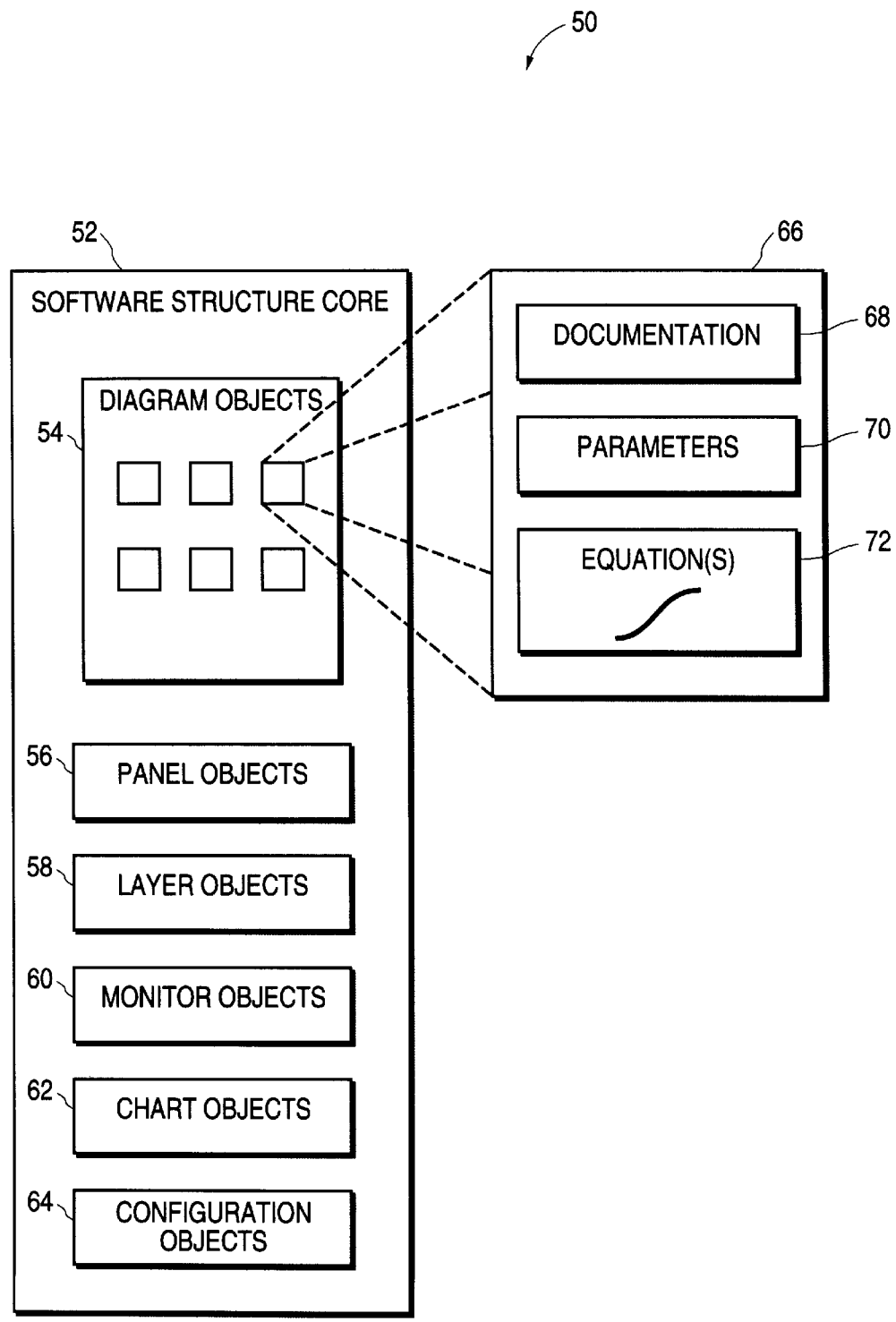
FIG. 3 is a diagrammatic representation of simulation modeling software according to one embodiment of the present invention.

The present specification describes exemplary methods for representing simulation models of systems, and for accessing and managing objects that describe such systems, utilizing graphical simulation modeling software. Referring to FIG. 3, there is provided a diagrammatic representation of one exemplary embodiment of simulation modeling software 50 according to the present invention. Specifically, the modeling software 50 comprises a core 52, which may be coded using an object-oriented language such as the C++ or Java programming languages. Accordingly, the core 52 is shown to comprise classes of objects, namely diagram objects 54, access panel objects 56, layer panel objects 58, monitor panel objects 60, chart objects 62, and configuration objects 64. As is well known within the art, each object within the core 52 may comprise a collection of parameters (also commonly referred to as instances, variables or fields) and a collection of methods which utilize the parameters of the relevant object. The functioning and purposes of each of the various classes of objects shown in FIG. 3 will become apparent from the description that follows. An exploded view of the contents of an exemplary diagram object 66 is provided, from which it can be seen that the diagram object 66 includes documentation 68 which provides a description of the diagram object, a collection of parameters 70, and methods 72 which may define an equation or class or equations. The diagram objects 54 each define a feature or object of a modeled system which is displayed within a diagram window presented by a graphical user interface (GUI) which interacts with the core 52. According to one exemplary embodiment of the invention, the diagram objects 54 may include state, function, modifier and link objects which are represented respectively by state nodes, function nodes, modifier icons and link icons within the diagram window. The objects 56–64, in one exemplary embodiment, each define respective windows (or panels) which are overlaid on a diagram window to present selected information regarding the modeled system, and to facilitate user interaction with the model. For the purposes of this specification, the term "panel" shall be given a broad interpretation and taken to refer to any designated or identified area with a display, regardless of shape, size or demarcation. Accordingly, the term "panel" shall be taken to encompass, but not be limited to, a "window" with a GUI.

Figure 4:
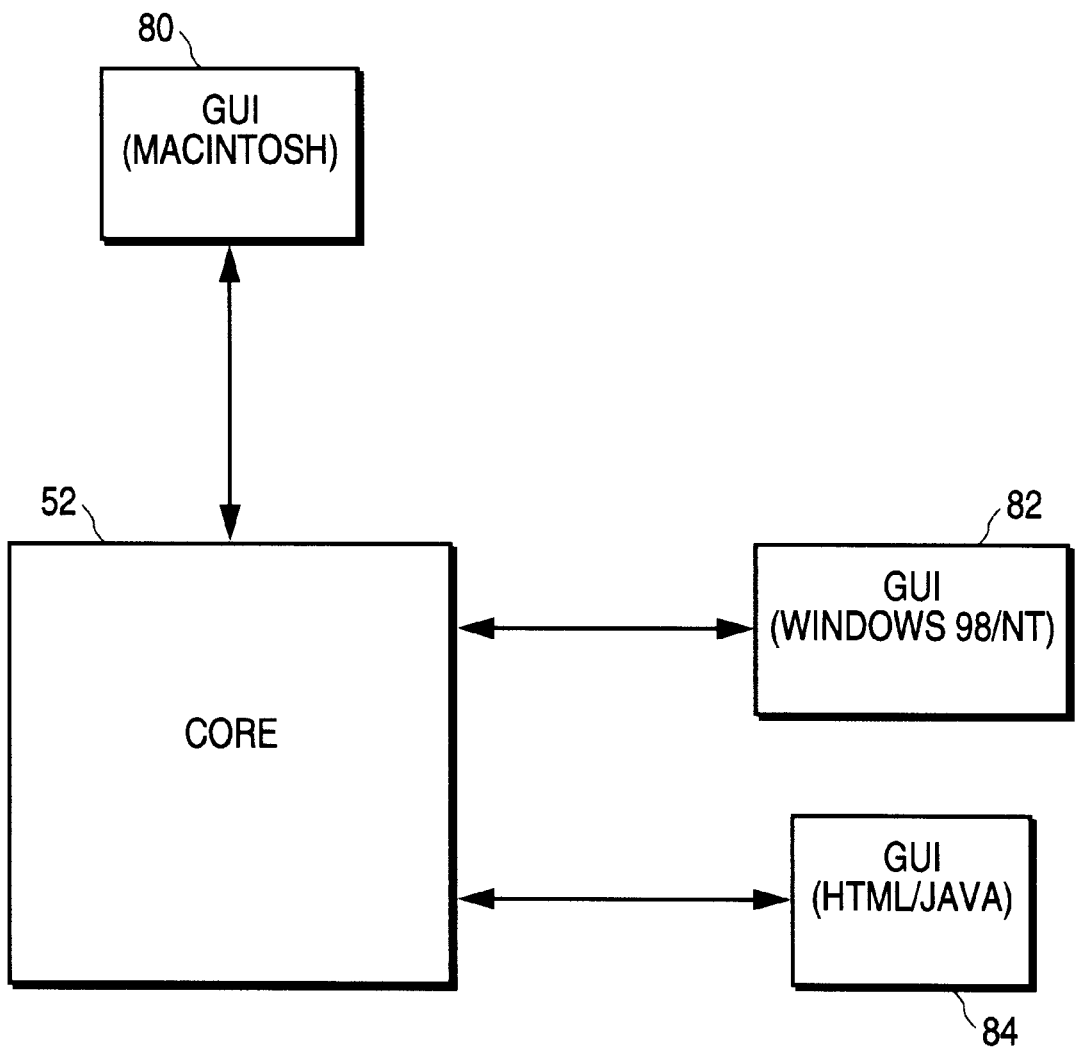
FIG. 4 is a diagrammatic representation of the interaction between the software illustrated in FIG. 3 and GUIs operating on various software platforms.

FIG. 4 provides a diagrammatic representation of the core 52, which is shown to be capable of interaction with any one of a number of GUIs. Specifically, the core 52 is shown to interface with a GUI 80 operating on the Macintosh platform developed by Apple Computer, Inc. of Cupertino, Calif., a GUI 82 operating on either the Windows '98 or Windows NT platforms developed by Microsoft Corporation of Redmond, Wash., or a platform-independent GUI 84 coded in Hyper-Text Markup Language (HTML) or the Java language developed by Sun Microsystems of Mountain View, Calif. Each of the GUIs interacts with the core 52 to present a diagram window in which icons representative of the diagram objects 54 are displayed, and in which panels (or windows) representative of panel objects 56, layer objects 58, monitor objects 60, chart objects 62 or configuration objects 64 may be displayed.

Parameters

As discussed with reference to FIG. 3, each object defined within the software core 52 may have at least one parameter associated therewith which quantifies certain characteristics of the object, and which is used during simulation of the modeled system. It will also be appreciated that not all objects must include a parameter. In one exemplary embodiment of the invention, several types of parameters are defined. Firstly, system parameters may be defined for each subject type. For example, a system parameter may be assigned an initial value for a state object, or a coefficient value for a link object. Other parameter types include object parameters and diagram parameters that facilitate easy manipulation of values in simulation operations. Specifically, diagram parameters are available to all objects, while each object parameter is available only to a single object.

Referring now to FIG. 5, there is shown a parameter window 90, that may be generated by any one of the GUIs shown in FIG. 4, and that provides a user with information regarding a parameter and allows the user to input or specify a value to be attributed to the respective parameter. The manner by which a parameter window 90 is invoked and constructed within a GUI will be described below. The exemplary parameter window 90 is shown to include four sections, namely a definition section 92, a units section 94, a settings section 96 and a range section 98. The definition section 92 displays an identifier (or symbol) for the parameter, as well as an appropriate definition of the parameter. In the illustrated parameter window 90, the parameter is represented by the symbol "C", which is defined as the coefficient of an equation within a specific object. The units section 94 displays units used internally and for assessment. The units used for assessment are used for a value that is designated as a "working" value in the settings section 96. If the internal and assessed units are different, a conversion may also be indicated in the units section 94. In the illustrated example, the assessed value is reciprocated and multiplied by a constant K that converts from hours assessed to a half-life calculation value.

The settings section 96 includes three values for the relevant parameter, namely a working value, a baseline value and a comparison value. It is possible to designate either the baseline or comparison value as the working value. For example, the user may be able to drag-and-drop the baseline or comparison value, using a pointing device such as a mouse, into the block 100. The working value will be updated accordingly. The baseline value is specified by the original builder of a simulation model in which the relevant parameter is utilized, and cannot be modified directly by a user. The settings section 96 further includes description blocks into which the user may enter descriptions for each of the working, baseline and comparison values.

The range section 98 may optionally be used to define upper and lower value limits that may be assigned to the parameter. Again, description fields for each of the upper and lower limits are provided.

Graphical Elements

Figure 6:
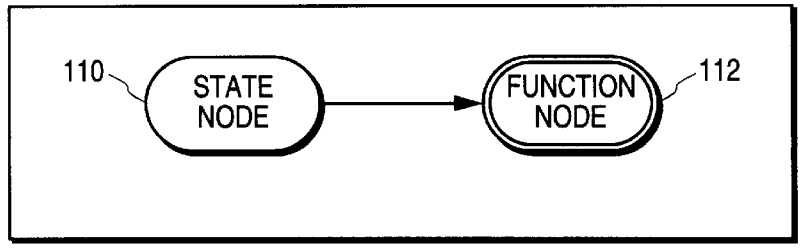
FIG. 6 illustrates two exemplary node representations which may be utilized to represent objects of a simulation model according to the present invention.
Figure 7:
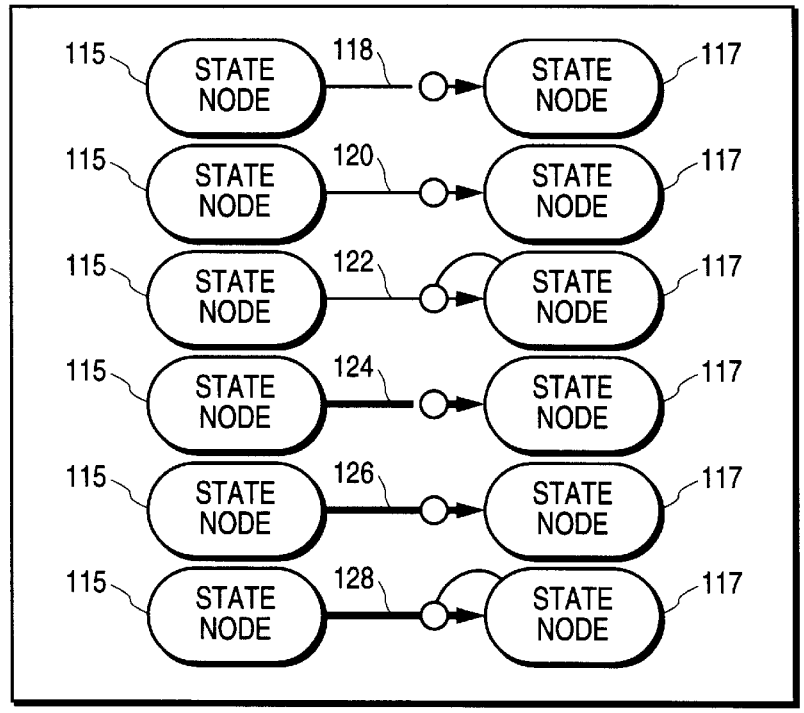
FIG. 7 illustrates exemplary link representations which may be utilized, according to one embodiment of the present invention, to illustrate a relationship condition between state or function nodes of a simulation model.
Figure 8:
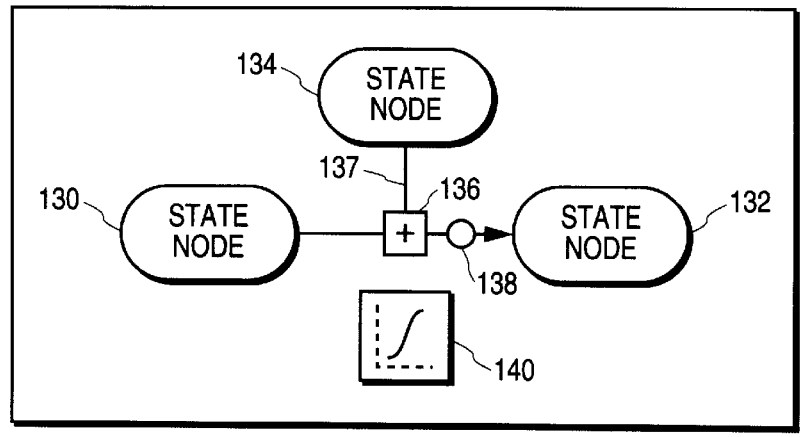
FIG. 8 illustrates a modifier representation which, according to one embodiment of the present invention, may be utilized to represent the influence of a third node on a relationship condition which exists between first and second nodes of a simulation model.

FIGS. 6–8 provide examples of graphical elements which, according to one exemplary embodiment of the invention, may be utilized to construct a display of a simulation model according to the invention. The illustrated graphical elements are made available by a GUI to a model builder, who is then able to construct a representation of a modeled system. In the description which follows, the term "node" is used to reference an icon which is representative of a state or function, and the term "link" used to reference an icon that represents a link object. It will be appreciated that the graphical elements discussed below are exemplary and any distinctive graphical elements may be substituted for the graphical elements discussed below without departing from the spirit of the invention.

Figure 9:
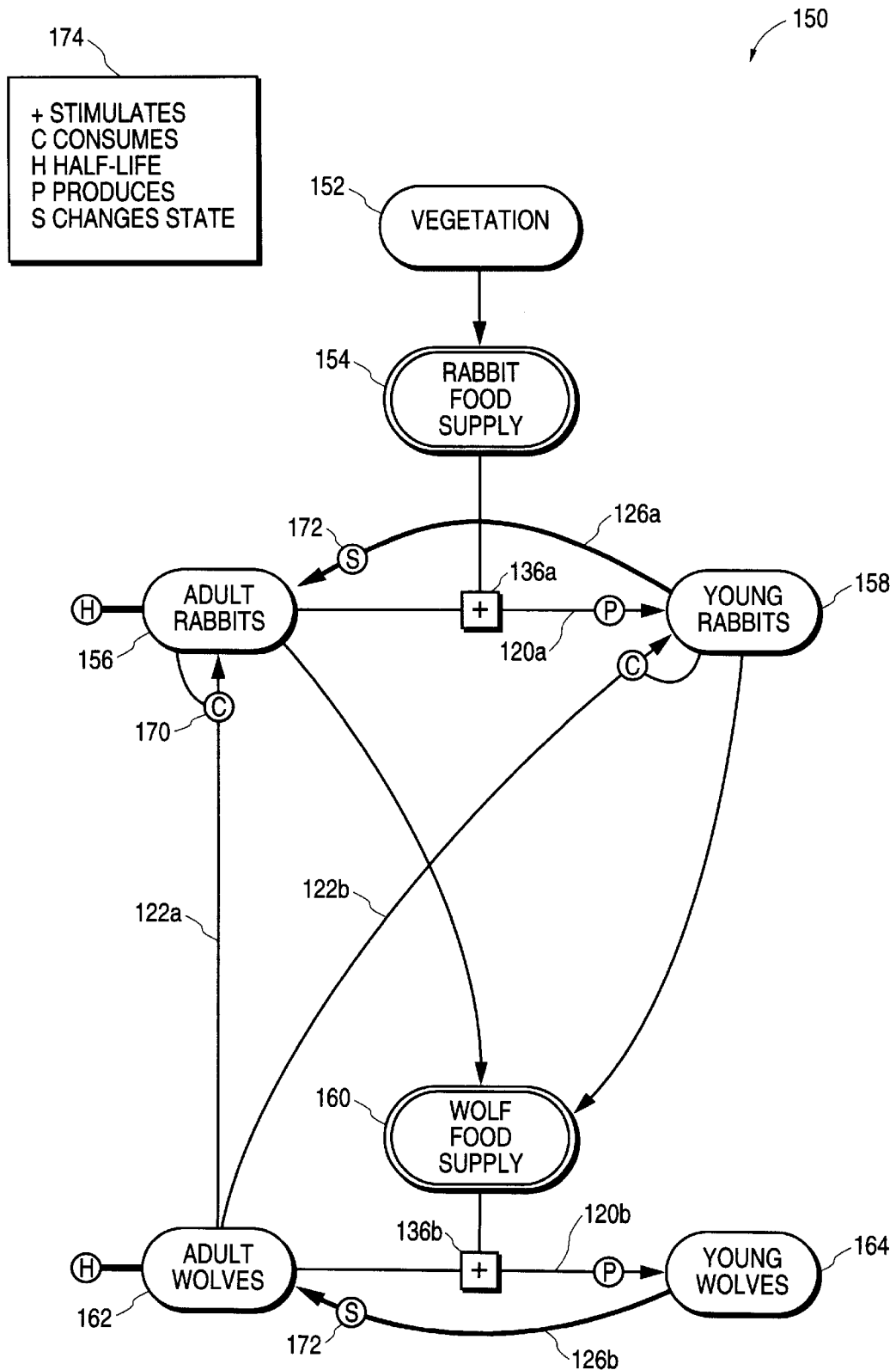
FIG. 9 illustrates an exemplary representation of a simulation model constructed utilizing the graphical elements defined according to one embodiment of the present invention.

The graphical elements discussed below with reference to FIGS. 6–8 may be used to construct a simulation model, such as that shown in FIG. 9. Referring firstly to FIG. 6, there are illustrated examples of two node types, namely a state node 110 and a function node 112. In order to distinguish between state and function nodes 110 and 112, reference will also be made now to FIG. 9. FIG. 9 illustrates an exemplary simulation model 150 that represents a predator-prey system. In the model system, the predators comprise wolves and the prey comprise rabbits.

Referring back to FIG. 6, a state node 110 represents an underlying state object defining a condition or state within the modeled system. In the representation of the simulation model 150 in FIG. 9, it will be noted that state node represent various conditions within the model. Specifically, a "vegetation" state node 152 represents the state of vegetation within the model 150, while state nodes 156, 158, 162 and 164 respectively represent rabbit and wolf population numbers. The various objects underlying the state nodes may comprise one or more parameters and/or one or more equations (or methods) for which are effected or influenced by links (which may also be termed "arrows") which feed into the respective state nodes (i.e. state and function objects are influenced by link objects). For example, the "adult rabbits" state node 156 represents an object including a parameter indicating the number of adult rabbits within the simulation at any specific time.

Referring to FIG. 6, a function node 112 represents a function object that defines an element within the simulation model that is purely a function of zero or more objects (or parameters) within the simulation model. Referring again to the simulation model 150 shown in FIG. 9, two function nodes 154 and 160 are shown respectively to represent objects representing rabbit food supply and wolf food supply. Each of the function nodes 156 and 160 includes a parameter that is a function of parameters of nodes that are shown by links to feed into the relevant function node. For example, the function node 154, which has a parameter whose value represents the quantity of rabbit food available, is shown to be a function of the vegetation node 152. Similarly, the function node 160, which includes a parameter whose value indicates the available quantity of wolf food, is a function of the "adult rabbit" node 156, and the "young rabbit" node 158.

FIG. 7 illustrates a set of link representations 118–128 which a model builder may select to represent a relationship condition which exists between two objects, represented by nodes, within simulation model. Each of the link representations 118–128 is associated with and represents a different relationship condition. Referring firstly to a "constant effect" link representation 118, this link representation indicates a relationship condition between first and second objects, represented by the state nodes 115 and 117 respectively, wherein the first object has an effect on the second object, and this effect is independent of any values of parameters associated with the first or second node. In one embodiment the link representation 118 represents the effect as constant over the duration of a simulation operation. The link representation 118 is distinguished in that the tail portion of the link representation is spaced from the circle behind the arrowhead. A "proportional effect" link representation 120 represents a relationship condition between first and second objects wherein the first object has an effect on the second object, and the magnitude of this effect is dependent on the value of a parameter of the first object, represented by state node 115. The link representation 120 is distinguished in that the tail portion thereof contacts the circle behind the arrowhead. Referring to FIG. 9, examples of "proportional effect" link representations are indicated at 120a and 120b. Specifically, the "adult rabbit" state node 156 is shown to have a proportional effect on the "young rabbit" state node 158 in that the number of young rabbits will increase in proportion to the number of adult rabbits. The same holds true for the link representation 120b, which represents the effect of the "adult wolves" node 162 on the "young wolves" node 164.

An "interaction effect" link representation 122 represents that a first object, represented by the state node 115, has an effect on a second object, represented by state node 117 and that the effect is dependent on the values of parameters of both the first and second objects. The link representation 122 is distinguished in that the tail portion of the representation engages the circle, and in that an arcuate line extends from the circle to the state node 117. Referring again to FIG. 9, two examples of "interaction effect" link representations are shown at 122a and 122b. Specifically, the "adult wolves" node 162 is shown to have an effect on the "adult rabbits" node 156. Specifically, as indicated by the "C" in the circle 170, adult wolves consume adult rabbits. The rate or magnitude of this consumption is determined by both the number of adult wolves and the number of adult rabbits, and the effect of the object represented by node 162 on the object represented by node 156 is accordingly dependent on the value of parameters (e.g. population numbers) associated with each of these objects respectively. The same explanation applies regarding the effect of the object represented by the "adult wolves" node 162 on the object represented by the "young rabbits" node 158, between which the "interaction effect" link representation 122b extends.

A "constant conversion" link representation 124, shown in FIG. 7, represents that instances of a first object represented by the state node 115 are converted to instances of a second object represented by the state node 117. The "constant conversion" link representation 124 further represents that the number of instances converted is independent of any values of parameters associated with the first or second object. In one embodiment, the link representation 124 denotes this conversion as being constant, and is not effected by external parameters. The link representation 124 is characterized in that a tail portion thereof is thickened relative to the tail portion of the "constant effect" link representation 118, and that this tail portion is spaced from the circle behind the head of the link representation 124.

A "proportional conversion" link representation 126 represents that a number of instances of a first object, represented by the state node 115, are converted to instances of a second object, represented by the state node 117. Further, the link representation 126 indicates that the number of instances converted is dependent on the number of instances of the first object. Referring to FIG. 9, "proportional conversion" link representations are drawn at 126a and 126b. Specifically, the link representation 126a represents that instances of an object represented by the "young rabbit" node 158 are converted to instances of an object represented by the "adult rabbit" node 156. Further, the number of young rabbits (i.e. young rabbit instances) converted to adult rabbits (i.e. adult rabbit instances) is dependent on the number of young rabbit instances, which exist within the object represented by node 158. Similarly, the number of instances of an object represented by the "young wolves" node 164 that are converted to instances of an object represented by the "adult wolves" node 162 is dependent on the number of instances of the object represented by the "young wolves" node 164. The circles 172 of the "proportional conversion" link representations 126a and 126b are shown to include the letter "S", which indicates that the type of conversion that occurs is a change in state. It will be appreciated that any symbol could similarly be included within the circle of a link representation to provide further information regarding the type of relationship condition which exists between objects represented by nodes between which a link representation extends.

An "interaction conversion" link representation 128 represents that a number of instances of a first object, represented by state node 115, are converted to instances of a second object, represented by state node 117. Further, the "interaction conversion" link representation 128 represents that the number of instances of the first object that are converted to instances of the second object is dependent upon respective numbers of instances of both the first and the second objects. The link representation 128 is distinguished in that the tail portion is thickened relative to the tail portion of the link representation 122, and that an arcuate line extends from a circle within the representation 128 to the state node 117 representing the second object.

From the above description of the link representations 118–128, it will be noted that each link represents a relationship condition between first and second objects as being either an "effect" relationship or a "conversion" relationship. Further, each link representation 118–128 represents the relationship condition as being either constant, proportional or interactive.

The link representations 118–128 shown in FIG. 7 are exemplary, and any appropriate link representations can be used to represent the various relationship conditions described above. It will be appreciated that the relationship conditions that are represented by the various link representations 118–128 are typically defined by the model builder. To this end, examples of mathematical expressions of relationship conditions that may be represented by the various link representations are provided below in Table 1. The mathematical expressions given in Table 1 are for a dynamic simulation model which is driven by the progression of time. The link representations 118–128 could similarly be used in a static model, such as a model for which time may be assigned a user-inputted value.

TABLE 1

| LINK TYPE | RELATIONSHIP CONDITION (EQUATION) |
| --- | --- |
| Constant Effect Link | $\frac{dT}{dt} = K + \ldots$ |
| | where T is the target node and K is a constant. |
| Proportional Effect Link | $\frac{dT}{dt} = C \cdot S(t)^a + \ldots$ |
| | where T is the target node, S is the source node, C is a coefficient, and a is an exponent. |
| Interaction Effect Link | $\frac{dT}{dt} = C(S(t)^a + T(t)^b) + \ldots$ |
| | where T is the target node, S is the source node, and a and b are exponents. This equation can vary depending |

TABLE 1-continued

| LINK TYPE | RELATIONSHIP CONDITION (EQUATION) |
|---|---|
| | on the operation selected in the parameter dialog. The operations available are S + T, S − T, S*T, T/S, and S/T. The equation shown is for S + T. |
| Constant Conversion Link | $\frac{dT}{dt} = K \cdot R + \ldots$ |
| | $\frac{dS}{dt} = -K + \ldots$ |
| | where T is the target node, S is the source node, K is a constant, and R is a conversion ratio. |
| Proportional Conversion Link | $\frac{dT}{dt} = C \cdot R \cdot S(t)^a + \ldots$ |
| | $\frac{dS}{dt} = -C \cdot S(t)^a + \ldots$ |
| | where T is the target node, S is the source node, C is a coefficient, R is a conversion ratio, and a is an exponent. |
| Interaction Conversion Link | $\frac{dT}{dt} = R \cdot C(S(t)^a + T(t)^b) + \ldots$ |
| | $\frac{dS}{dt} = -C(S(t)^a + T(t)^b) + \ldots$ |
| | where T is the target node, S is the source node, a and b are exponents, and R is a conversion ratio. This equation can vary depending on the operation selected in the parameter dialog. The operations available are S + T, S − T, S*T, T/S, and S/T. The equation shown is for S + T. |

As noted above, each of the link representations 118–128 includes a circle in which a graphical identifier providing further information regarding the relationship condition can be displayed. For example, referring to FIG. 9, each of the link representations is shown to contain an alphabet letter which provides further information regarding the relationship condition between two respective objects. A GUI may also provide an index table 174, such as shown in FIG. 9, which provides a key to the identifiers displayed in the circles of the various link representations.

Figure 10:
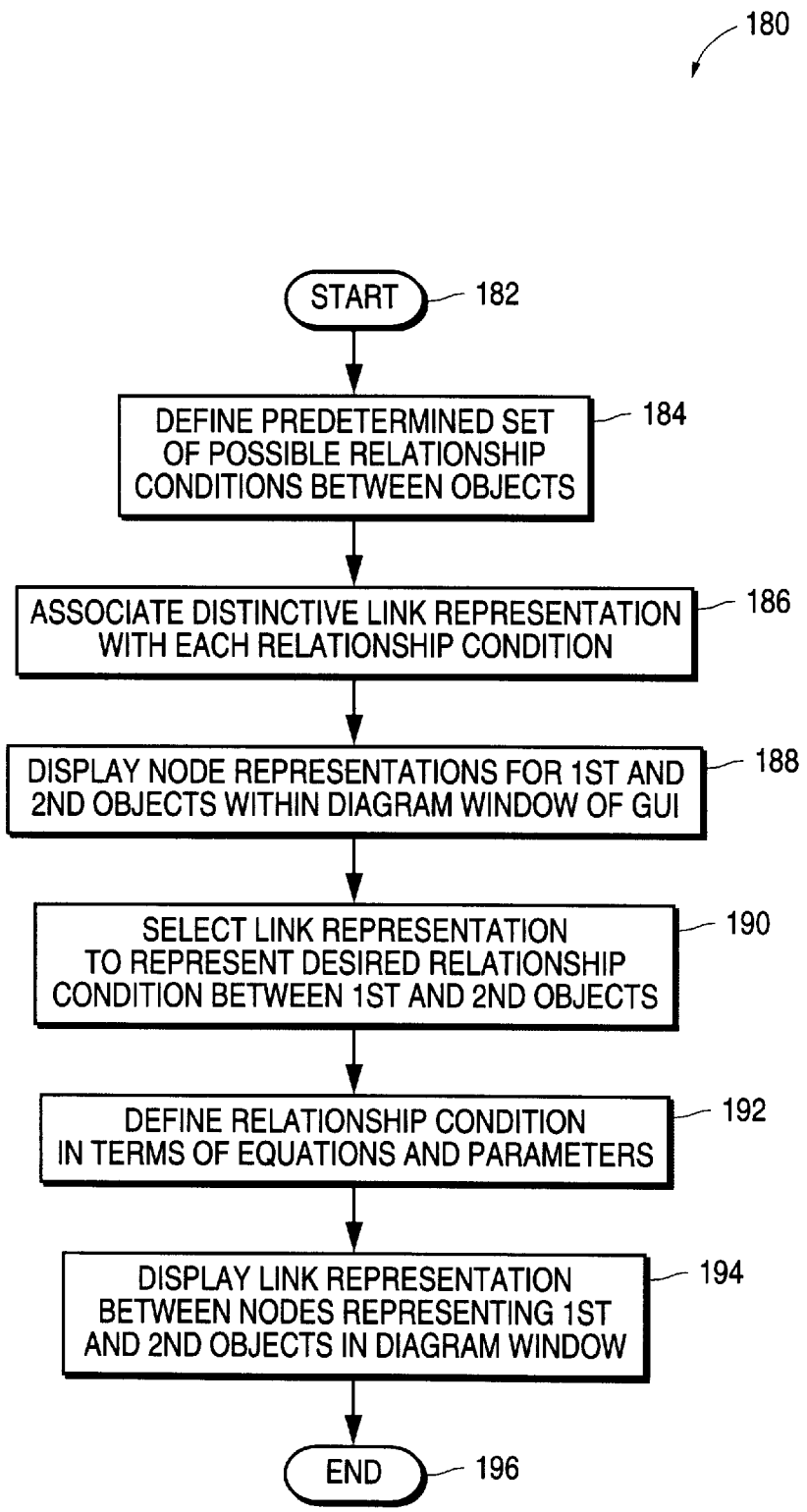
FIG. 10 is a flow chart illustrating a method, according to one embodiment of the present invention, of generating a display of a simulation model.

Referring now to FIG. 10, there is shown a flow chart illustrating a method 180, according to one exemplary embodiment of the invention, of generating a display (or graphical representation) of a simulation model. In one embodiment, the steps of method 180 are performed by a GUI in conjunction with the software core 52 illustrated in FIG. 3. The method commences at step 182, and proceeds to step 184 where a predetermined set of relationship conditions that may exist between objects in the simulation model are defined. For example, the defined relationship conditions may comprise the six relationship conditions described above with reference to FIG. 7, and may be expressed in the form of equations. At step 186, a respective link representation is associated with each of the relationship conditions in the set. For example, the link representations 118–128 may each be associated with a distinct relationship condition, as described above with reference to FIG. 7. Looking now at a minimum construction at step 188, the GUI displays node representations, such as state nodes 115 and 117, for first and second objects. The display of the node representations occurs in response to a user input. At this step a user may also input further information, such as parameter values, equations and documentation, to define the diagram objects (i.e. state and/or function objects) such as those shown at 54 in FIG. 3.

Having thus generated at least two node representations for display by the GUI, and having defined the objects that underlie these node representations, the user at step 190 then selects a link representation, from the link representations associated with the predetermined set of relationship conditions, to represent a desired relationship condition between the objects represented by the first and second nodes (e.g. to specify an equation or class of equations which define a relationship between the first and second objects). At step 192, a user may then further define the relationship condition between the objects in terms of parameter values. For example, the relationship condition between the objects could be expressed in terms of a dynamic equation such as any one of those provided above in Table 1. Parameters defining the relationship condition may be inputted and defined by using a parameter window 90 such as that shown in FIG. 5. The user may also optionally specify further information to be included within the link representation. For example, the user may specify an identifier to be incorporated within the circle of any one of the link representations 118–128 shown in FIG. 7. The method 180 then proceeds to step 194, where the GUI displays the selected link representation to show the relationship condition that exists between the objects represented by the first and second nodes.

The association of different link representations with each distinct relationship condition of a set is particularly advantageous in that a user viewing a display of a simulation model, such as the simulation model 150 in FIG. 9, is able immediately to ascertain and understand the relationships between the objects represented by the nodes without having to "drill-down" into the representation or to access additional information windows. The inclusion of identifiers within the respective circles of each of the link representations 118–128, and the provision of a key 174 for each of the identifiers, further enhances understanding of the display.

Figure 11:
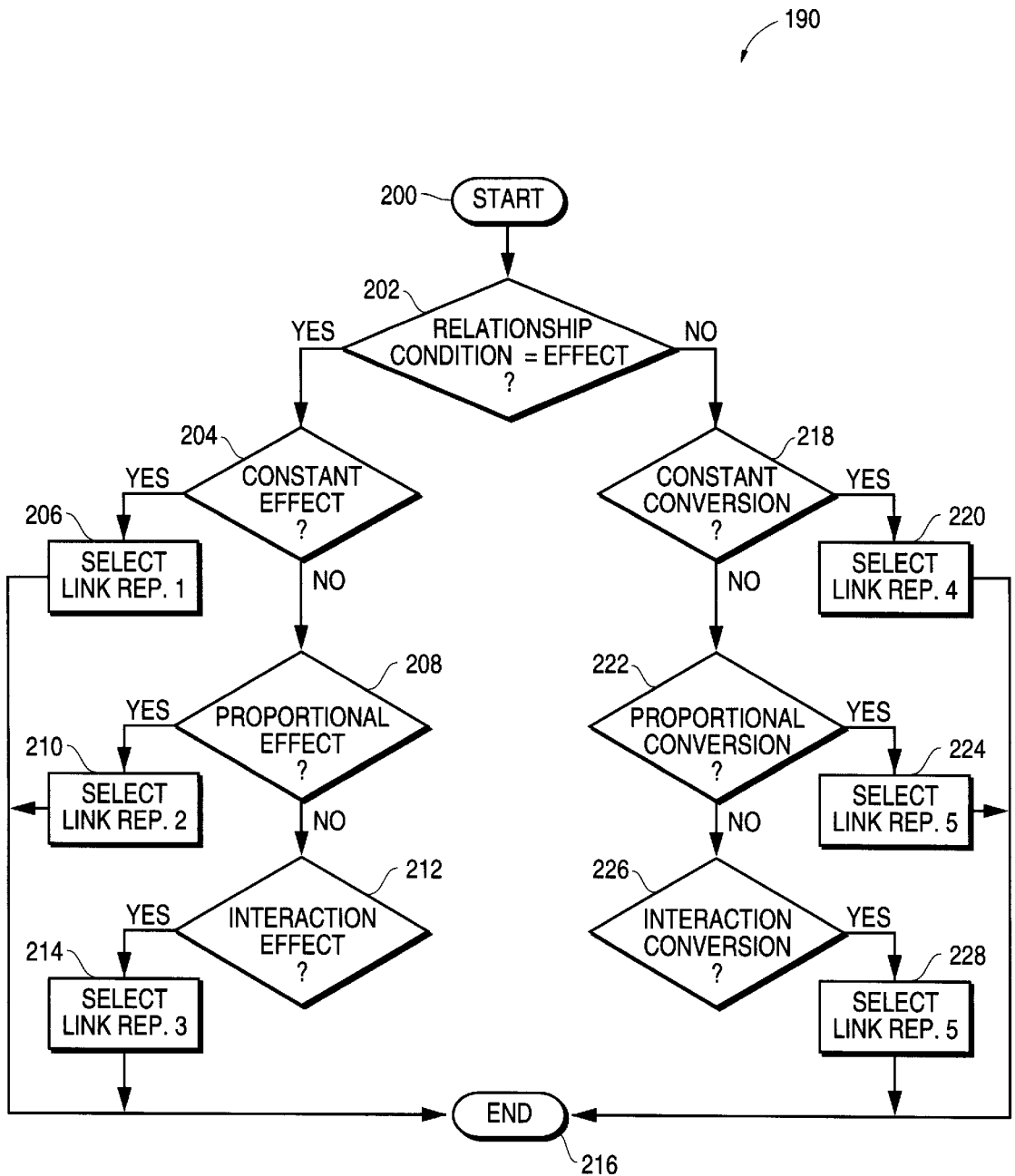
FIG. 11 is a flow chart illustrating a method, according to one embodiment of the present invention, of selecting a link representation to represent the relationship condition between two objects within a simulation model.

FIG. 11 is a flow chart illustrating an exemplary method 190 of selecting a link representation from a predefined set to represent a relationship condition between objects represented by first and second nodes within a diagram window. The method 190 commences at the step 200 and then proceeds to decision box 202, where a determination is made as to whether the relationship condition between the first and second objects is an "effect" relationship or a "conversion" relationship. If it is determined that the relationship condition is properly classified as an effect relationship, the method proceeds to decision box 204, where a determination is made as to whether the effect is constant. If so, an appropriate link representation (e.g. link representation 118) is selected at step 206. If the effect relationship is not constant, the method 190 proceeds to decision box 208, where a determination is made as to whether the effect of the one object on the other is dependent on the value of a parameter associated with one of the objects. If so, the method proceeds to step 210, where an appropriate link representation (e.g. link representation 120) is selected. Alternatively the method 190 proceeds to decision box 212, where a determination is made as to whether the effect of one object on the other is dependent on values of parameters associated with each of the objects. If so, the method 190 proceeds to step 214, where an appropriate link representation (e.g. link representation 122) is selected. From step 214, the method terminates at step 216.

Returning to decision box 202, if it is determined that the relationship condition between the objects is not an "effect" relationship condition, but rather a "conversion" relationship condition, the method proceeds from decision box 202 to decision box 218, where a determination is made as to whether the "conversion" relationship condition requires that a constant number of instances of one object be converted to instances of the other object. If so, the method proceeds to step 220, where an appropriate link representation (e.g. link representation 214) is selected. Alternatively, the method proceeds to decision box 222, where a determination is made as to whether the "conversion" relationship condition specifies that the number of instances of the one object that are converted to instances of the other object is dependent on the number of instances of either one of these objects. If so, the method proceeds to step 224, where an appropriate link representation (e.g. link representation 126) is selected. Alternately, the method proceeds to decision box 226, where a determination is made as to whether the "conversion" relationship condition requires that the number of instances of one object that are converted to instances of the other object is dependent on respective numbers of instances in both the first and second objects. If so, an appropriate link representation (e.g. link representation 128) is selected. From step 228, the method 190 proceeds to terminate at step 216.

Returning to FIG. 8, a model builder may wish to model a situation where a relationship condition, represented by a link representation 138, between objects represented by nodes 130 and 132, is influenced by a third object, represented by node 134. According to one embodiment of the present invention, overlaying the relevant link representation 138 with a modifier representation 136 may represent this influence of the third object on the relationship condition between the first and second objects. The node 134 representing the third object is further shown to feed into the modifier representation 136 by a link representation 137. The modifier representation 136 includes an identifier that provides an indication of the type of effect the third object has on the relevant relationship condition. For example, as it is case in FIG. 8, the modifier representation 136 may include a "+" symbol, which may indicate that the third node has a stimulating effect on the relevant relationship condition. Referring to FIG. 9, modifier representations 136a and 136b each include the "+" symbol, which indicates that a third object (i.e. a "rabbit food supply" object) has a stimulating effect on the production by "adult rabbits" object instances of "young rabbits" object instances. The modifier representation 136 represents an analogous situation with respect to the wolf population in the simulation model 150.

In one embodiment of the present invention, a modifier representation may include a "−" symbol to represent that a third object has an inhibiting effect on the relationship condition between a pair of objects. Further, a modifier representation may include a "=" symbol which indicates that the third object may have either an inhibiting or stimulating effect on the relationship between a pair of objects, dependent on the value of a parameter of the first object, the third object or a modifier object represented by the modifier representation. For example, a parameter of the third object could have a certain threshold below which the third object has a stimulating effect on the relationship condition and above which the third object has an inhibiting effect on the relationship condition.

Figure 12:
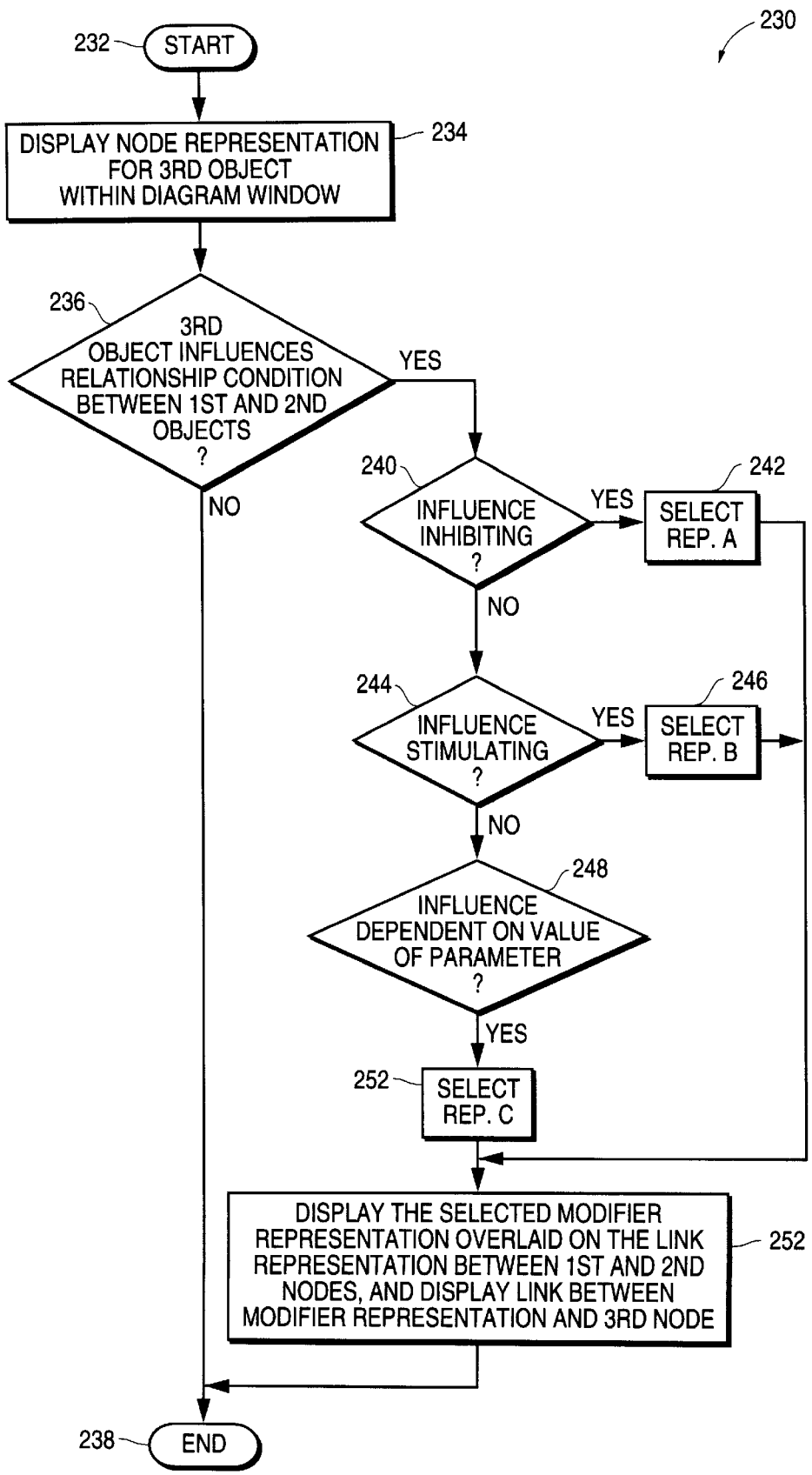
FIG. 12 is a flow chart illustrating a method, according to one embodiment of the present invention, of displaying a modifier representation which represents the influence of an object on a relationship condition between a pair of objects.

To this end, reference is now made to FIG. 12 which illustrates a method 230, according to one embodiment of the invention, of displaying a modifier representation which represents the influence of an object on a relationship condition between a pair of objects. The method commences at step 232, and proceeds to step 234 where a node representation for a third object of the simulation model is displayed within a diagram window in response to a user input. The method then proceeds to decision box 236, where determination is made as to whether the third object influences a relationship condition, represented by an appropriate link representation, between two objects represented in the diagram window by respective node representations. If not, the method terminates at step 238. If so, the method proceeds to decision box 240, where a determination is made as to whether this influence is inhibiting. If so, a modifier representation including an appropriate identifier (e.g. "−") is selected at step 242. Alternatively, the method 230 proceeds to decision box 244, where a determination is made as to whether the influence is stimulating. If so, a modifier representation, including an appropriate identifier (e.g. "+") is selected at step 246. Alternatively, the method proceeds to decision box 248, where a determination is made as to whether the influence is dependent on a value of a parameter of the third object. If so, a modifier representation including an appropriate identifier (e.g. "=") is selected at step 252.

The identifiers mentioned above are, of course, merely exemplary and any suitable identifier could be included within a modifier representation to advertise a characteristic of an underlying modifier object. For example, modifier representations including the "A" or "B" could also be used to identify the underlying modifier object as "allowing" or "blocking" a relationship condition (e.g. an effect or conversion relationship condition) between a two objects.

From steps 242, 246 or 252, the method 230 proceeds to step 252, where the selected modifier representation is overlaid on a link representation between nodes for the first and second objects, and a link representation is generated between a node representation for the third object and the modifier representation. The method then terminates at step 238.

The modifier representation represents an underlying modifier object, which may in turn be expressed in terms of an equation. In one embodiment, the modifier object may comprise a function of parameters within the simulation model. An example of an equation expressing a modifier object is provided below in Table 2.

TABLE 2

Modifier $\quad \dfrac{dT}{dt} = M \cdot f\left(\dfrac{S(t)}{N}\right) \cdot \text{linkterm} + \ldots$ where T is the target node, M is a multiplier constant, N is a normalization constant, F() is a function, either linear or specified by a transformation curve, and link term is the an link term. Note that modifiers also have an additive or multiplicative setting; this setting specifies whether multiple modifiers on a link should add or multiply their terms together before being multiplied by the link term.

In Table 2, the "link term" expression refers to an equation which is embodied in a link object to express a relationship condition between two objects. Examples of such equations are provided above in Table 1 in the "RELATIONSHIP CONDITION (EQUATION)" column.

Panels—Accessing Selecting Parameters

While FIG. 9 shows a simple simulation model 150 for the purposes of explanation, it will be appreciated that the graphic elements described above may be used to generate a model for a very complex system, such as an aspect of human physiology or a complex manufacturing system. In such a case, the simulation model may include hundreds or even thousands of objects, each of which may include a number of parameters. In order to perform effective "what-if" analyses using a simulation model, it is useful to access and observe the input values of certain key parameters prior to performance of a simulation operation, and also possibly to observe output values for these key parameters at the conclusion of such an operation. As many parameters are included in the expression of, and are effected by, a relationship between two objects, a modeler may also need to examine certain parameters at either end of such a relationship. For example, a modeler may wish to examine parameters that specify the effects a specific object has on a number of other objects, and also parameters that specify the effects of these other objects upon the specific object. Complex models are also often broken down into a system of sub-models, either using software features or merely by the modeler's convention. It is accordingly often useful for the modeler simultaneously to view selected parameters contained within a specific sub-model. The satisfaction of this need is complicated by the fact that the boundaries of a sub-model may not be mutually exclusive with respect to parameters, i.e., a single parameter may appear in many sub-models. Further, the boundaries of sub-models often change as the model evolves.

A modeler utilizing modeling software may be required to invoke a parameter window for each variable the modeler wishes to access or view. It will be appreciated that the generation of a number of such windows, as may typically occur for a complex model, quickly result in a cluttered GUI. The managing and viewing of such a multitude of parameter windows is also awkward.

Figure 13:
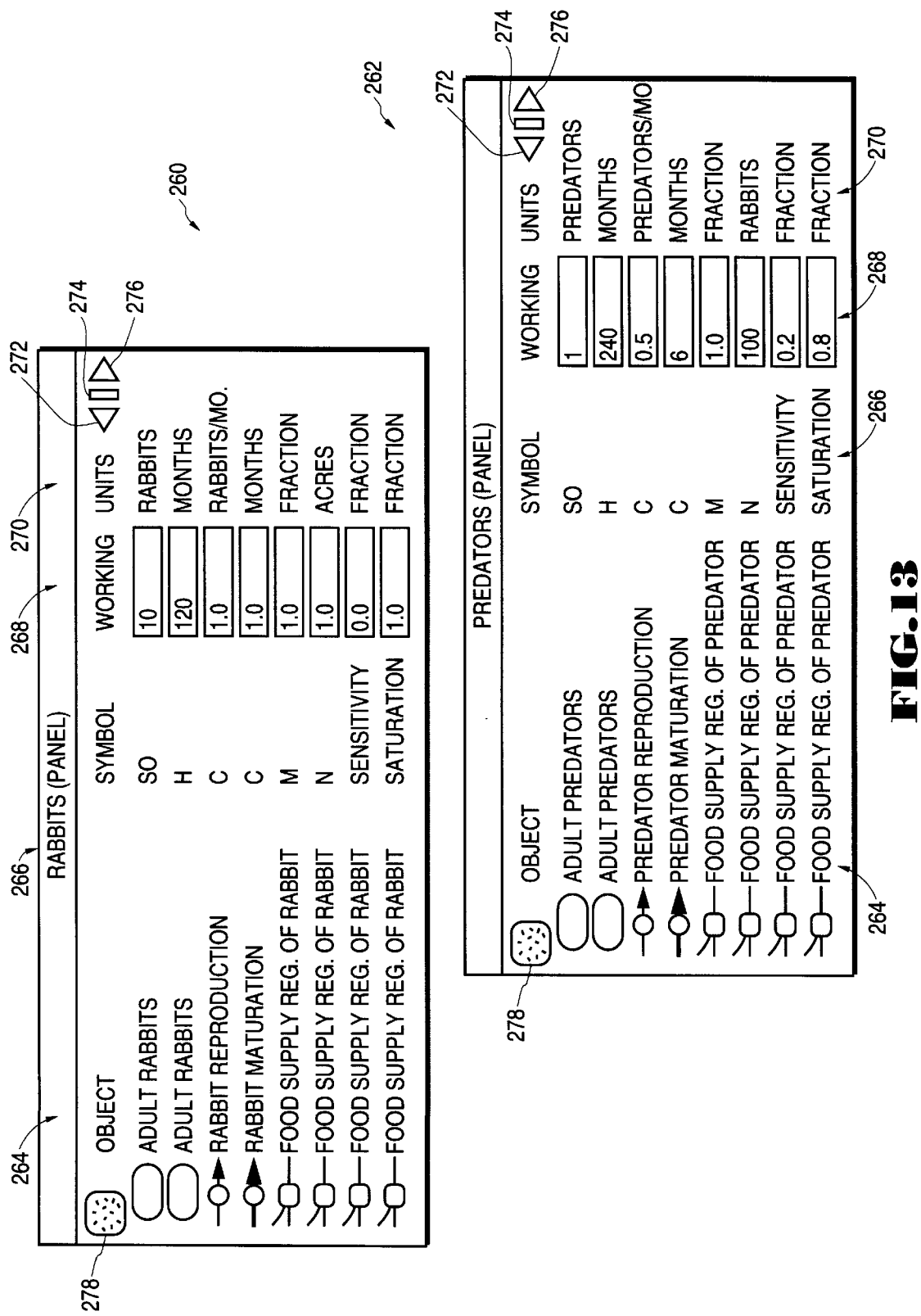
FIG. 13 illustrates access panels, according to one embodiment of the invention, by which a user can access parameter working values.

In order to accommodate the need to view and access a user-selected group of parameters within a simulation model, the present invention proposes providing a mechanism by which the modeler can create groupings of parameter "aliases" within windows or panels that can be overlaid, or displayed along side, a diagram window and that are distinct from the diagram window. The present invention further proposes allowing a modeler to create multiple access panels, each panel providing access to a user-selected group of parameters collected from an object or group of objects within the simulated model. FIG. 13 provides examples of two access panels 260 and 262, each of which contains information regarding user-selected parameters of objects within the exemplary simulation model 150 shown in FIG. 9. More specifically, the access panel 260 displays information for various parameters pertaining to the rabbit population modeled by the objects within the simulation model 150. Similarly, the access panel 262 displays information regarding parameters pertaining to the predator population represented by objects in the simulation model 150. Each of the access panels 260 and 262 has four columns of information, namely an object column 264, a symbol column 266, a working value column 268 and a unit column 270. The object column 264 includes both a node representation (or icon) and a text description for the object for each parameter included within the panel. As is apparent, objects from which parameters may be extracted include state objects, function objects, link objects, and modifier objects, which are collectively designated as being diagram objects 54 in FIG. 3. The symbol column 266 contains a specified symbol for each of the parameters included in the respective access panel, while the working value column 268 includes a working value for each of the parameters. In one embodiment of the invention, each working value comprises a fixed input value for a parameter, and is thus not effected by performance of a simulation operation. In another embodiment, the working value may comprise a current value for the parameter, and may thus reflect an output value at conclusion of a simulation operation. In this embodiment, as a simulation operation using the simulation model 150 proceeds, the working value displayed within the working value column 268 for each parameter may change and continually be updated. It is furthermore significant that a user is able to access a working value of the parameter in the column 268 by selecting an area within a panel in which the relevant working value appears. The user may then be able to change this parameter, and rerun a simulation operation, thus making the performance of "what-if" analyses particularly easy. The unit column 270 specifies the units for the relevant parameter.

The panels 260 and 262 shown in FIG. 13 are also advantageous in that they allow a user-selected group of parameters to be viewed together. The panels 260 and 262 provide a number of other features to a user to enhance the user-friendliness of a simulation model. Specifically, by selecting (e.g. by double clicking on) the icon for any particular object within the panel, the user is able to invoke a parameter window 90, such as that shown in FIG. 5, for the relevant parameter.

Each of the access panels 260 and 262 further includes navigation icons 272 and 274, which may be selected by user (e.g. by double clicking thereon) to move between panels. For example, assuming that the "predator" panel 260 is currently active and displayed (i.e. accessible by a user) and that the "rabbit" panel 260 was also defined by the GUI, a user could select either the "backward" navigation icon 272 or "forward" navigation icon 274 to place the panel 262 in an inactive state and to place the panel 260 in an active and displayed state, in which a user can access the working values of the parameters of the panel 260. It will be appreciated that where more than two panels are defined by a GUI, the navigation icons 272 and 274 provide a convenient and user-friendly method of navigating between such panels.

Each panel also includes a list icon 276, which is situated between the navigation icons 272 and 274. Upon user selection of the list icon 276 on the panel, a drop-down menu (not shown) including a list of all panels extant within the GUI is invoked. The list may contain a name for each extant panel, and may provide an identifier, such as a check mark, adjacent the name of the currently active panel. From this list, a user is then able to designate another panel as the active panel.

Each of the access panels 260 and 262 is representative of an underlying panel object 56, such as those shown in FIG. 3.

Figure 14:
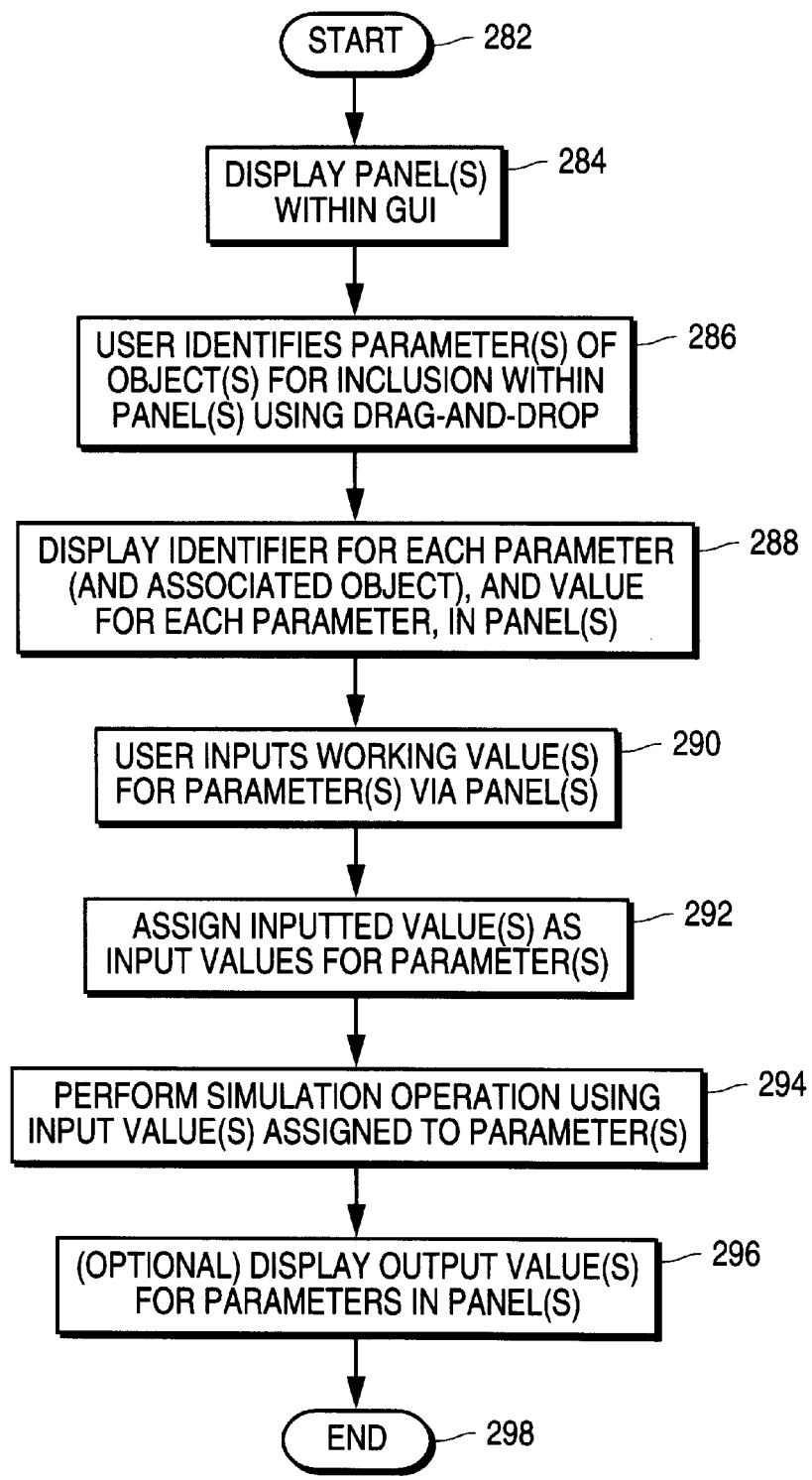
FIG. 14 is a flow chart illustrating a method, according to one embodiment of the invention, of creating an access panel and of accessing parameters of a simulation model utilizing such a panel.

Methods of creating an access panel, such as panel 260 in FIG. 13, and an associated panel object 56, and of accessing parameters within such a panel, are described with reference to FIG. 14. The method commences at step 282, and then proceeds to step 284, where a panel is displayed within the GUI. The panel represents an underlying panel object 56, which is dedicated to receiving and storing input values for user-designated parameters within the simulation model. The panel is displayed in response to the user selection of an appropriate menu item. At step 286 a modeler (also termed a "user") identifies a parameter of an object for inclusion within the displayed panel. According to one exemplary method, the modeler may identify a parameter to be included within a panel by performing a drag-and-drop operation using the symbol of a parameter from an appropriate parameter window 90, such as that shown in FIG. 5. In a further method, the modeler may perform a similar drag-and-drop operation utilizing the symbol for a parameter that appears in a previously defined panel. Referring back to FIG. 13, it will be seen that each of the panels 260 and 262 also includes a transfer icon 278 in the upper left-hand corner. By performing a drag-and-drop operation with respect to the transfer icon 278, a modeler is able to transfer all parameters within a particular panel to another panel in one operation. The transfer icon 278 is advantageous in that it allows duplicates of panels to be created with relative ease. Returning now to FIG. 14, at step 288, an icon and name for the object to which the parameter belongs, a parameter symbol, a parameter working value and parameter units are displayed within the panel, as explained above with reference to the access panels 260 and 262. At step 290, a value for at least one parameter is received via the panel as the working value for the parameter. In one embodiment, the working value is an input value which is maintained within the panel, and which is not effected by performance of the simulation operation. It will of course be appreciated that a modeler may input values for any number of parameters within a panel in this manner. At step 292, in response to the value being inputted via the panel at step 290, inputted value is assigned to the appropriate parameter. At step 294, a user then initiates a simulation operation in which the value assigned to the parameter is utilized by the simulation model as an input value in performance of the simulation operation. In one embodiment, the working value is not altered in response to performance of the simulation operation. However, in an alternative embodiment, during and/or on completion of the simulation operation, output values for parameters included within the panel may optionally be displayed in the working value column 268, at step 196. The method then terminates at step 298.

Layers-Storing Values for a Set of Parameters

As discussed above with reference to FIG. 5, each parameter of each object within a simulation model may have three values associated therewith, namely a working value, a baseline value and a comparison value. These are displayed in the settings section 96 of a parameter window 90 for the relevant parameter. The collections of working, baseline and comparison values for all parameters within a simulation model may conveniently be termed working, baseline and comparison foundations. As described in reference to FIG. 5, the model builder typically specifies the baseline parameter values that constitute the baseline foundation when a simulation model is constructed.

Taking the simulation model 150 shown in FIG. 9 as an example, it will be appreciated that a particular set of baseline parameter values (of a baseline function) may represent a particular model scenario or condition. For example, parameters associated with the "adult wolves" and "young wolves" objects represented by nodes 162 and 164 respectively may represent a scenario in which the predators comprise wolves. However, by assigning a different set of values to the relevant parameters, a scenario in which the predators comprise coyotes may be represented and modeled. Accordingly, it will be appreciated that a set of values for a particular set of parameters may correspond to a specific model scenario. Such sets of parameters can be viewed as "macros" for configuring the model. In order to allow a user conveniently to substitute one scenario within the simulation model with another (e.g. substituting a wolf predator scenario with a coyote predator scenario), the present invention proposes a mechanism by which a modeler can create groupings of parameter "aliases" which may conveniently be termed "layers". Each layer comprises a set of parameter values that may be substituted for a set of parameter values within the baseline foundation. In contradistinction to the panels discussed above with reference to FIGS. 13 and 14, a layer comprises a set of parameter values which are stored at a separate location from the baseline values, so as to allow the user to switch between the values contained in one or more layers and the baseline values.

Figure 15:
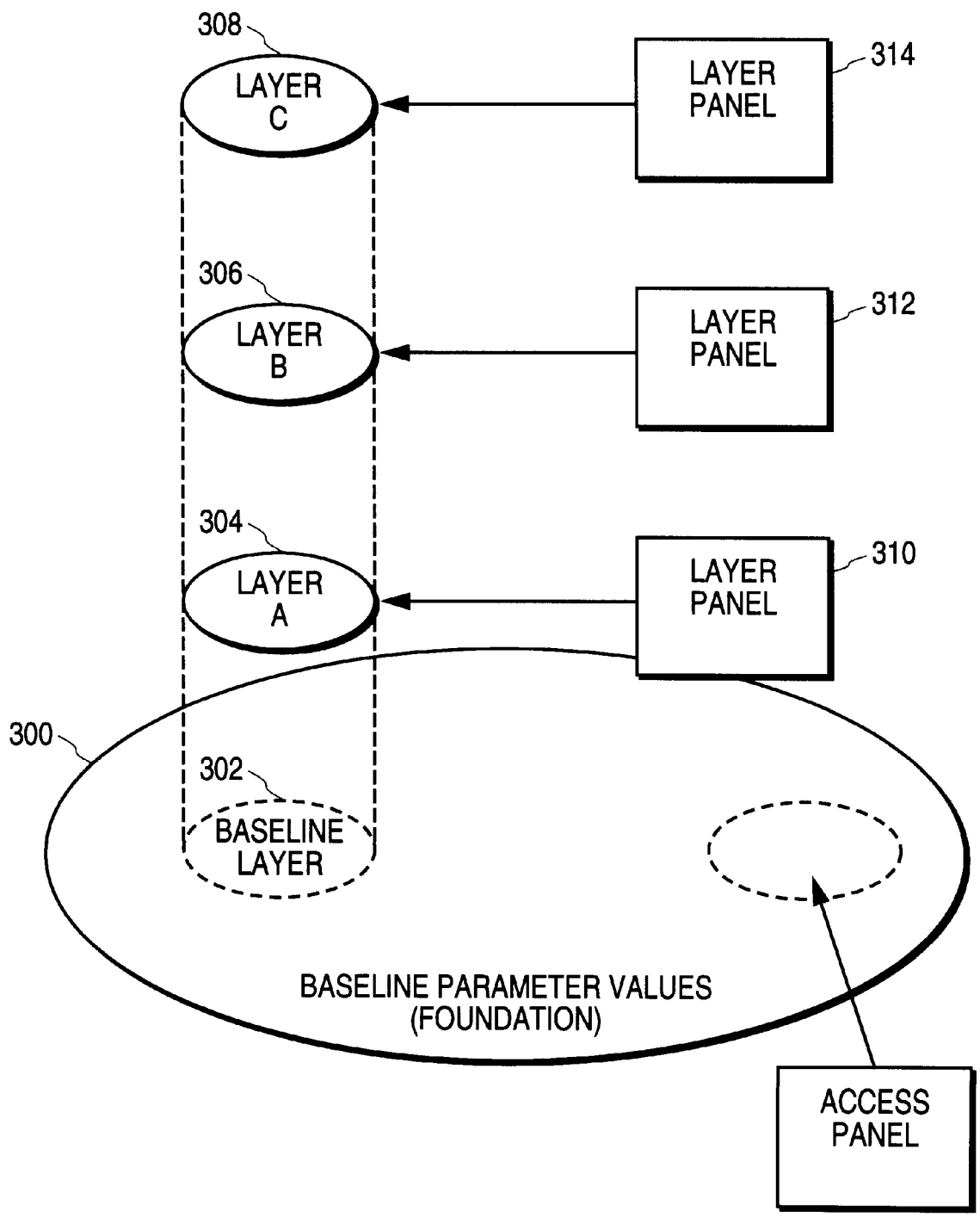
FIG. 15 is a diagrammatic representation of a baseline foundation, a baseline layer, and three alternative layers which may be substituted for the baseline layer.

Reference is made to FIG. 15 which shows a diagrammatic representation of a baseline foundation 300 containing a baseline layer 302, which comprises a set of baseline values for a predetermined set of parameters. The baseline layer 302 is shown to be replaceable by any one of three layers 304–308, each of which contains a set of alternative values for the predetermined set of parameters.

Each of the layers 304–308 has a respective layer panel 310–314 associated therewith, which allows a modeler to construct the respective layer and to then view the values attributed to the various parameters which are included in the associated layer. Each of the layer panels 310–314 is similar in appearance and layout to the access panels shown in FIG. 13, but the propose and functioning of the layer panels are fundamentally different from that of the access panels. Turning now to FIG. 16, exemplary layer panels 310 and 312 are illustrated. Each of the panels 310 and 312 includes:

(1) An object column 320, which contains an icon and text identifier for the object to which these respective parameter belongs;

(2) A symbol column 322, which contains a symbol for each parameter included in the panel;

(3) A layer value column 324, which contains a layer value for each parameter of the panel; and (4) A units column 326, which indicates the units in which the respective layer values are expressed.

A modeler is able to include parameters within a layer panel in the same manner utilized to construct an access panel. It will be noted that the layer panels 310 and 312 shown in FIG. 16 each include an identical set of the parameters, but that each layer panel 310 and 312 attributes different layer values to each of these parameters. Specifically, the layer panel 310 attributes values to the relevant parameters which models a scenario within the simulation model 150 shown in FIG. 9 in which the predators comprise wolves. Similarly, the layer panel 310 attributes values to the relevant parameters which models a scenario within the simulation model 150 in which the predators comprise coyotes. For example, panel 310 specifies wolves as having a life expectancy of 240 months, whereas panel 312 specifies coyotes as having a life expectancy of 180 months. Similarly, the reproductive rate of coyotes is specified to be higher than that of wolves and the time required for young wolves to mature into adults is also specified to be longer than the period required for young coyotes to mature. Each of the layer panels represents an underlying layer object 58, as illustrated in FIG. 3.

Figure 17:
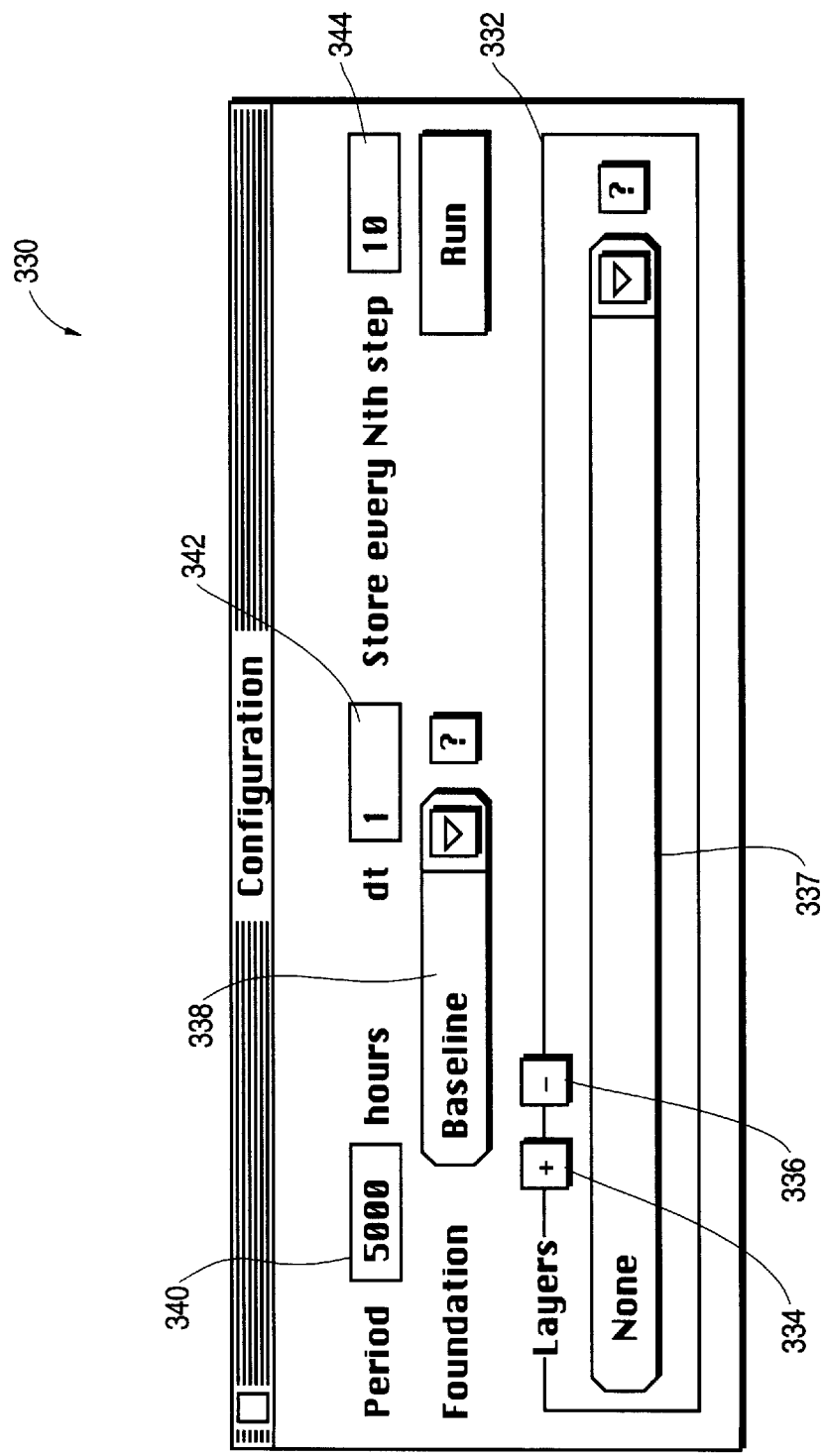
FIG. 17 illustrates a configuration panel, according to one embodiment of the present invention, which may be utilized to apply and de-apply layers within a simulation model.

FIG. 17 shows a configuration panel 330 that may be utilized to apply and de-apply layers within a simulation model. Specifically, the configuration panel 330 includes a layer selection section 332, which lists the layers applicable to a simulation model. Utilizing an apply icon 334 (i.e. the "+" icon) and a de-apply 336 (i.e. the "−" icon), a user is able to apply and de-apply layers to the simulation model. Layers, which a user has the option of applying or de-applying, are listed in the list section 337, which in the illustrated example lists no layers. However, it will be appreciated that any number of layer panels may be a named within the list section 337. The configuration panel 330 further includes a foundation section 338, using which the working, baseline or comparison foundation may be selected as the foundation that the selected layer is to override. A period sector 340 allows a user to specify a time period over which a simulation operation by the simulation model is to be performed, while a delta-time (dt) section 342 allows a user to specify the time increment by which the simulation model progresses through the period specified in the period section 340. A store section 344 allows a user to specify the time increment at which values for parameters within the simulation model are stored. In the illustrated example, the simulation model will run over a 5000 hour period in increments of one hour, and values for parameters of the simulation model will be stored for every ten hour increment.

Figure 18:
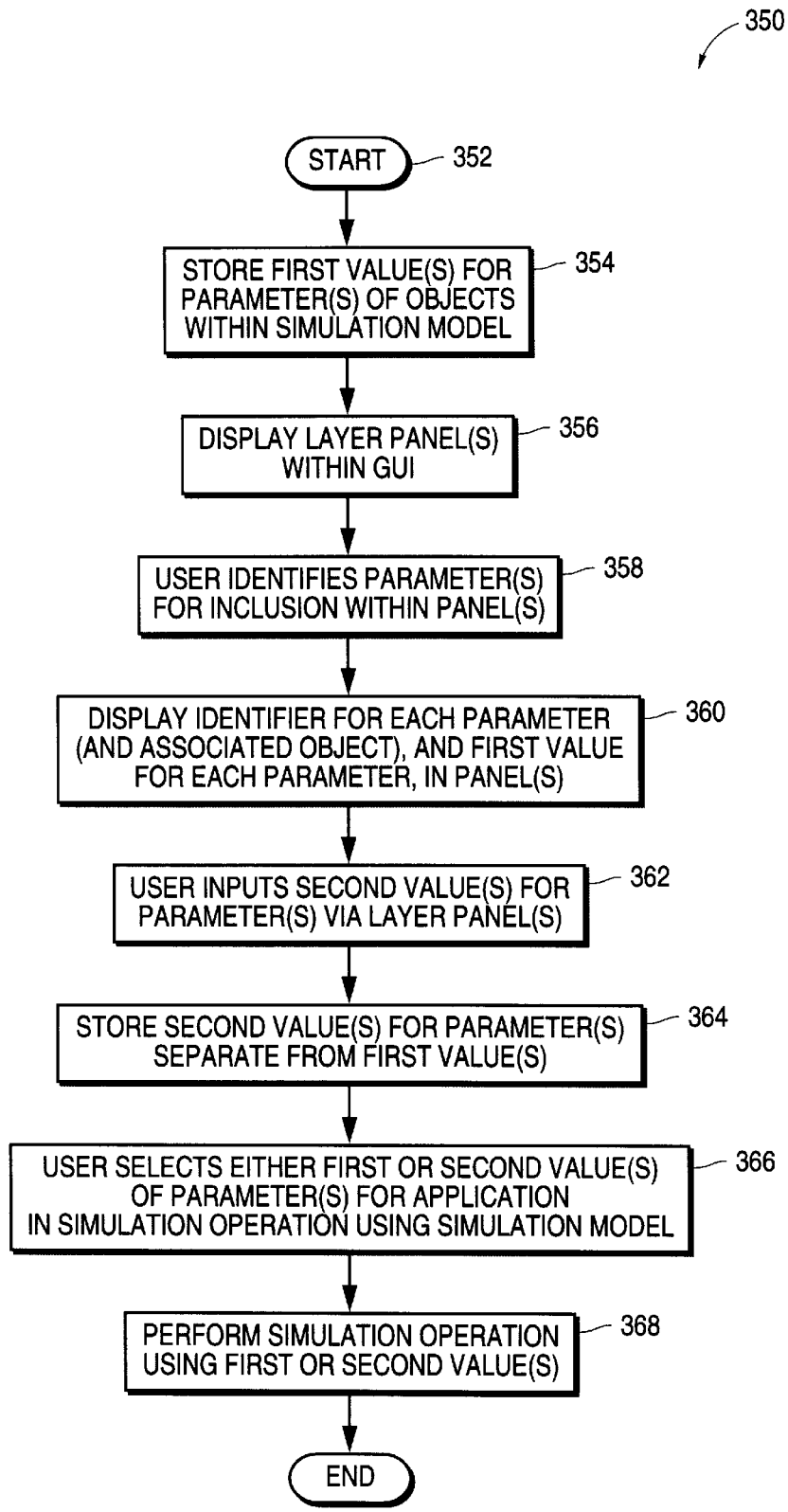
FIG. 18 is a flow chart illustrating a method, according to one embodiment of the invention, of managing objects within a simulation model.

FIG. 18 shows a flowchart illustrating a method 350, according to one embodiment of the present invention, of the managing objects within a simulation model. The method commences at step 352, and then proceeds to step 354, where a first set of values for parameters of objects within the simulation model are stored. A model builder typically specifies these initial values upon construction of the original model. At step 356, a layer panel is displayed within the GUI, typically in response to a user indication. For example, the user may select a menu item from a drop-down menu for the creation of a layer panel. Once the layer panel is displayed within the GUI, at least one parameter of the simulation model is identified for inclusion within the layer panel at step 358. This may be done in the same manner as parameters are included within access panels as described above with reference to the flowchart in FIG. 14. At step 360, and in response to the user identification of parameters at step 358, object and parameter identifiers, and the first values for the selected parameters, are displayed within the layer panel. At step of the 362, the user then inputs second (alternative) values for the selected parameters into the appropriate blocks within the layer value column 324 of the layer panel. At step 364, the core program 52 creates a layer object 58, and stores the second values for the selected parameters (e.g. on a hard disk), separate from the location at which the first values for the selected parameters are stored. Thus, the initial values for the selected parameters are available for recall and are not overwritten. At step 366, the user selects either the set of first values, or any set of alternative values, (e.g. the set of second values) for use within the simulation model. Using the configuration panel 330, the user may apply or de-apply layers within the simulation model to the thereby model different scenarios, and perform "what-if" analyses in an easy and convenient manner. At step 368, the user then performs a simulation operation utilizing the simulation model including the selected set (or layer) parameter values by selecting the "run" icon 339 provided on the configuration panel 330. The method 350 then terminates at step 360.

Monitors

Figure 19:
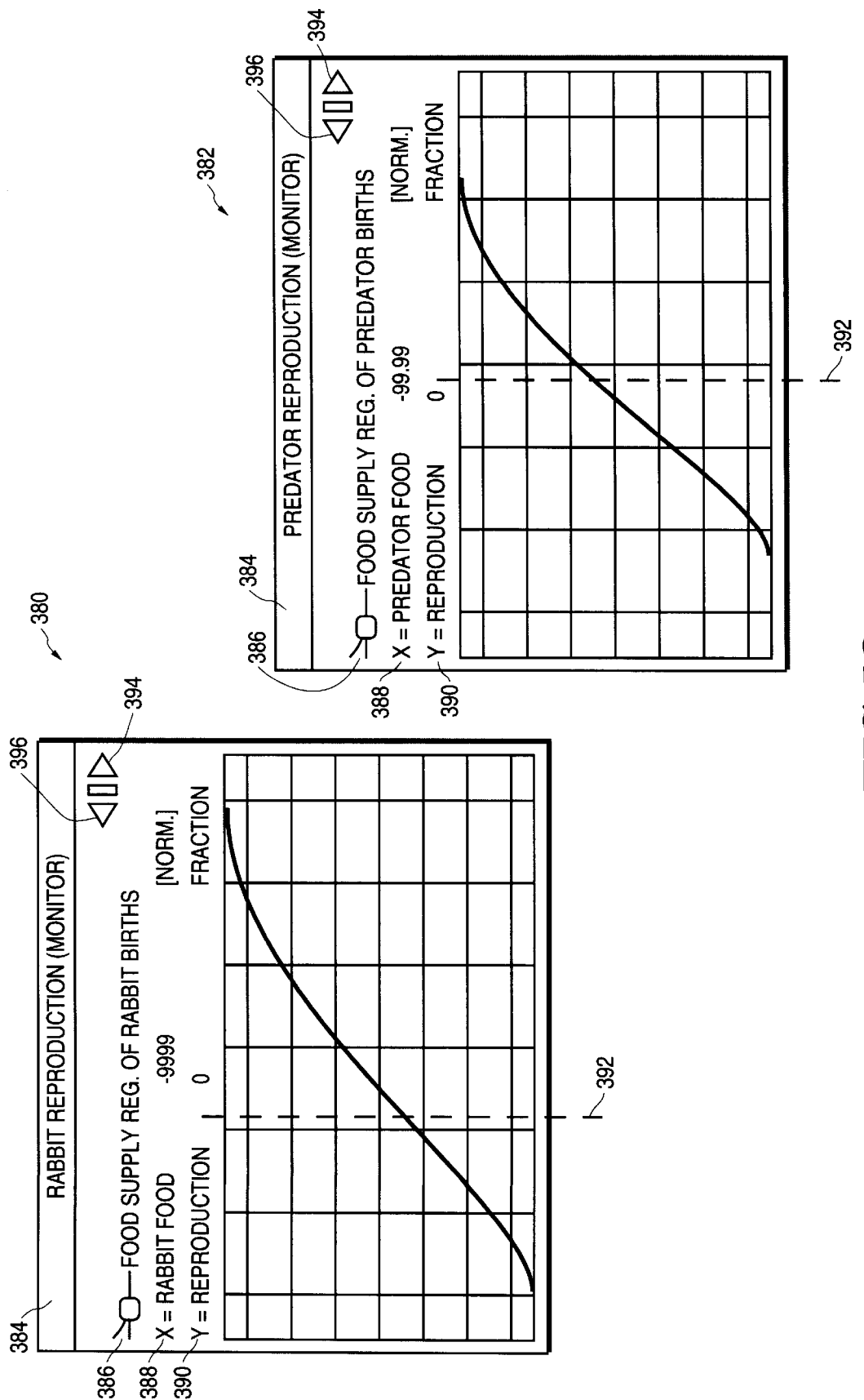
FIG. 19 illustrates two exemplary monitor panels, according to one embodiment of the present invention, which allow a user to monitor at least two parameters of objects within a simulation model.

The present invention further proposes a mechanism by which parameters within a simulation model can be monitored in an intuitive and useful manner. In one embodiment of the present invention, a proposed mechanism is particularly useful for viewing a curve of a transform that expresses a specified relationship between parameters of objects within the simulation model. The curve of the transform is typically the plot of an equation in which the parameters comprise co-efficients. Alternatively, the curve may be determined in some other manner, for example by experimentation, and then utilized to express the relationship between the relevant parameters. Referring now to FIGS. 9 and 19, FIG. 19 shows monitor panels 380 and 382, which plot curves expressing the relationships between food supply and reproduction for the rabbit and predator populations respectively within the simulation model 150. The relationships between the food supply and reproduction parameters expressed by the plotted curves of the monitor panels 380 and 382 are embodied within the modifier objects represented by the modifier representations 136a and 136b shown in FIG. 9.

Each of the monitor panels 380 and 382 includes a header 384, and an object identifier 386 which identifies the object that embodies the transform represented in the respective monitor panel. Accordingly, each of the monitor panels 380 and 382 shows a respective modifier icon at this location. Each object identifier 386 behaves in the same manner as described above for the access and layer panels and by double clicking on this icon, the same result is produced as by double clicking on a corresponding object identifier (or icon) within a diagram window Each of the monitor panels 380 and 382 further includes both X and Y parameter identifiers 388 and 390 which identify the respective X and Y input parameters for the plotted transform and also display current numeric values for each of these parameters at any given time. A monitor line 392 is also provided within each of these the monitor panels 380 and 382, and identifies the X input parameter value within the plotted a transform. Monitor panels may be used in conjunction with a further chart panel, as discussed below with reference to FIGS. 20a and 20b, to monitor the interaction of various parameters in a graphical manner and coordinated manner. For example, a user could thus monitor the effect of an adult rabbit population increase on predator reproduction rates in a graphical manner. This feature is particularly useful for developing dynamic models which include non-linear functions, as it is often useful to attempt to correlate an event in the model's behavior (e.g. observed in a plot of a model parameter value verses time) with a change from one domain to another domain in a non-linear function. For example, a user may wish to determine whether the non-linearity at a saturation point of a sigmoidal function is responsible for a temporal plateau in an output value of a parameter. Specifically, such a cause-effect relationship can be identified if the X parameter output value of the plotted function moves into a saturated region of the sigmoid (i.e. the dependent parameter value Y asymptotically approaches a maximum value Ymax as X exceeds a saturation point Xsaturation) at the same time that an output parameter value ceases to vary and remains constant over some time interval. Assuming that X is an input parameter value (i.e., time invariant) for the model, then one simply needs to look at a plot for the X output parameter value verses time and compare that to the Xsaturation during the period of interest for the output parameter value. It will be appreciated that the process is much more difficult when there is not some critical value, such as Xsaturation, in a function but rather a smooth transition between function domains. Difficulty is also increased when a user is attempting to correlate multiple events or multiple non-linear functions, or a function is not solely defined by time variant parameters (e.g., Xsaturation) but is at least partially defined by model parameter values which vary with time. In this case, not only is the independent output parameter value X changing with time, but the curve of the transform is changing with time as well.

To address the above identified needs, the present invention proposes creating a first graphical user interface (GUI) element in the form of a monitor panel, such as that shown in FIG. 19, which plots a non-linear function over a specified domain of a selected X parameter output value and creating a second graphical user interface element (GUI) in the form of a chart panel 402, such as that shown in FIG. 20a which plots at least one further model parameter value against time. Utilizing a monitor panel in conjunction with a chart panel it is possible, in a coordinated fashion, to monitor (both of graphically and directly) output values for X and Y parameters on a non-linear curve plot, and simultaneously to observe the value of a further dependent parameter value at a specific time on the chart panel. A monitor line 392 also provides "animation" of the function expressed by the curve plot of a monitor panel as a simulation models advances through time, or as a time parameter is attributed a certain value.

In another embodiment of the present invention, the Y parameter output value may be expressed as the function of a X parameter value and one or more further parameter values of the simulated model, and the curve plotted within the monitor panel may thus vary as time changes during a simulation operation.

To illustrate the above-described aspect of the present invention, reference is made to FIGS. 20a and 20b, which show screen prints of a GUI 400 diagramming the simulation model 150 shown in FIG. 9. The GUI 400 is shown to include a diagram window 401 overlaid with a chart panel 402, a monitor panel 404 and a configuration panel 330. As is apparent from the configuration panel 330, a single layer is applied within the simulation model, namely a "wolves" layer. The chart panel 402 plots both "Young Predators" and "Adult Predators" parameters over time, while the monitor panel 400 displays the curve defining the relationship between "Predator Food Supply" and "Reproduction Regulation" parameters. Referring firstly to FIG. 20a, as indicated within the chart panel 402, the simulation operation has progressed 74.6 months, this time being indicated by a time line 398. It is apparent that the "Young Predator" parameter shown in the chart panel 402 experiences a peak at just after this time within the simulation operation. The peak can be attributed to a drop in the food supply (i.e. rabbit population) to a level that new births of predators cannot be sustained. The monitor panel 400 illustrates the respective X and Y parameter values (i.e. the "Predator Food Supply" and "Reproduction Regulation" parameter value outputs) at this time utilizing monitor line 392, which intersects a point of the plotted curve. The Y parameter output value is shown to have "plateauxed" at this time, as shown in FIG. 20a, indicating that the birth rate is at its maximum (i.e. the birth rate has become saturated). Referring now to the FIG. 20b, the GUI 400 is shown 76.8 months into the simulation operation, and the time line 398 is according shown to have advanced beyond the peak of the "Adult Predator" parameter. The monitor line 392 is also shown to have retreated to the left, thus indicating that the X parameter output has no notable influence on the relevant Y parameter output at this time. Specifically, the effect of the drop in food supply levels, and the resulting drop in predator births, is reflected in the monitor panel. The net effect is that the predator birth rate drops to zero, the number of young predators drops as they mature into adult predators, and the adult predator population continues to rise, but then begins to plateau.

Figure 21A:
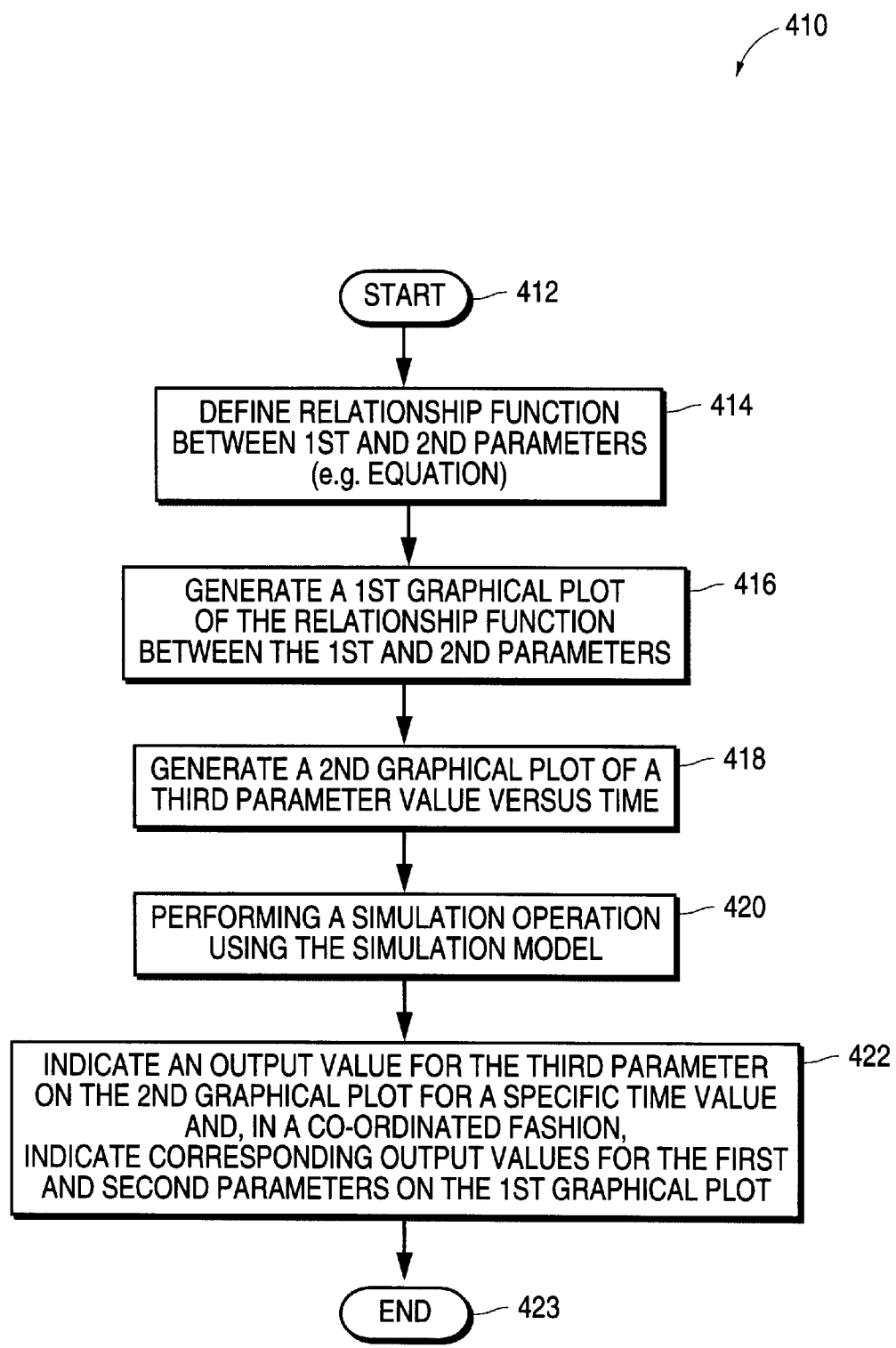
FIGS. 21a and 21b illustrate methods, according to respective embodiments of the present invention, of monitoring parameters within a simulation model.

Referring now to FIG. 21a, there is illustrated a method 410 of monitoring parameters within a simulation model, according to one embodiment of the present invention. The method 410 commences at step 412, and then progresses to step 414, where a relationship function between the first and second parameters of objects within the simulation model is defined. For example, the relationship could be expressed as a mathematical equation, or could alternatively be identified by experimentation. In one embodiment of the present invention, the relationship condition between the first and second parameters is expressed as a non-linear transform. The method 410 then proceeds to step 416, where a first graphical plot is generated within a monitor panel, this the first graphical plot illustrating the defined relationship function between the first and second parameters. The method 410 then proceeds to step 418, where a second graphical plot is generated within a chart panel, the second graphical plot plotting a third parameter value against time. At step 420, a simulation operation is performed utilizing the simulation model, which includes first, second and third parameters. At step 422, the respective values of the first and second parameters are indicated within the first graphical plot, and a corresponding value for the third parameter is indicated on the second graphical plot. As explained above, the values for the first, second and third parameters may be indicated using the monitor and the time lines 392 and 398 respectively. The method 410 then terminates at step 423.

In an alternative embodiment of the present invention, the first graphical plot could represent the relationship among three parameters, and the X-axis of the monitor chart could be a function of two parameters. In this case, the plot shown in the monitor panel would vary as time progressed during a simulation operation.

Figure 21B:
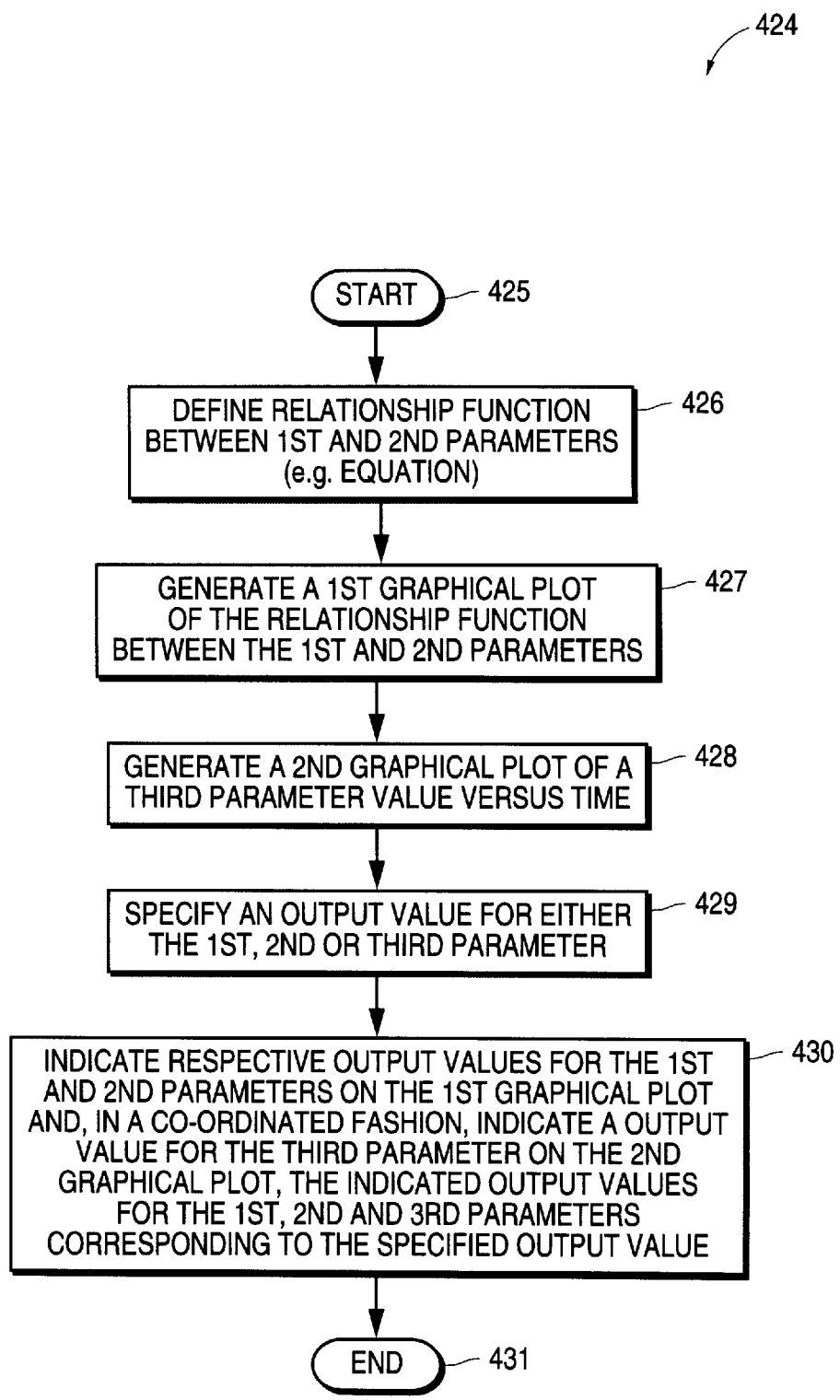

FIG. 21b illustrates a further method 424 of monitoring parameters within a simulation model. The method 424 commences at step 425, and then progresses to step 426, wherein a predetermined relationship function between first and second parameters of objects within the simulation model is defined, for example, as a mathematical equation. At step 427, a first graphical plot of the defined relationship function between the first and second parameters is generated. At step 428, a second graphical plot of a third parameter output value vs. time is generated within a chart panel. At step 429, an output value for either of the first, second or third parameters is specified. For example, a user may advance or retreat a monitor line 392 within a monitor panel to a specific location to thereby specify first and second parameter output values. Alternatively, the user could specify a time value on the second graphical plot and this way specify an output value for the third parameter.

At step 430, respective output values for the first and second parameters are indicated on the first graphical plot within the monitor panel. For example, the monitor line 392 may be advanced or retreated to indicate output values for the first and second parameters. In a coordinated fashion, an output value for the third parameter is similarly indicated on the second graphical plot, for example, by graphically highlighting a location on the second graphical plot. In this way, output values for the first, second or third parameters corresponding to the specified output value are indicated. The method then terminates at step 431.

It will be appreciated that the method 410 described with reference to FIG. 21a is time-driven, with the indicated output values for the first, second or third parameters being driven by the progression of time or by attributing a selected time value to a time parameter. In contrast, the method 424 described above with reference to FIG. 21b is parameter-driven, in that the output values for the first, second or third parameters is determined by a specified output value for either the first, second or third parameter.

Exemplary Simulation Model

Figure 22:
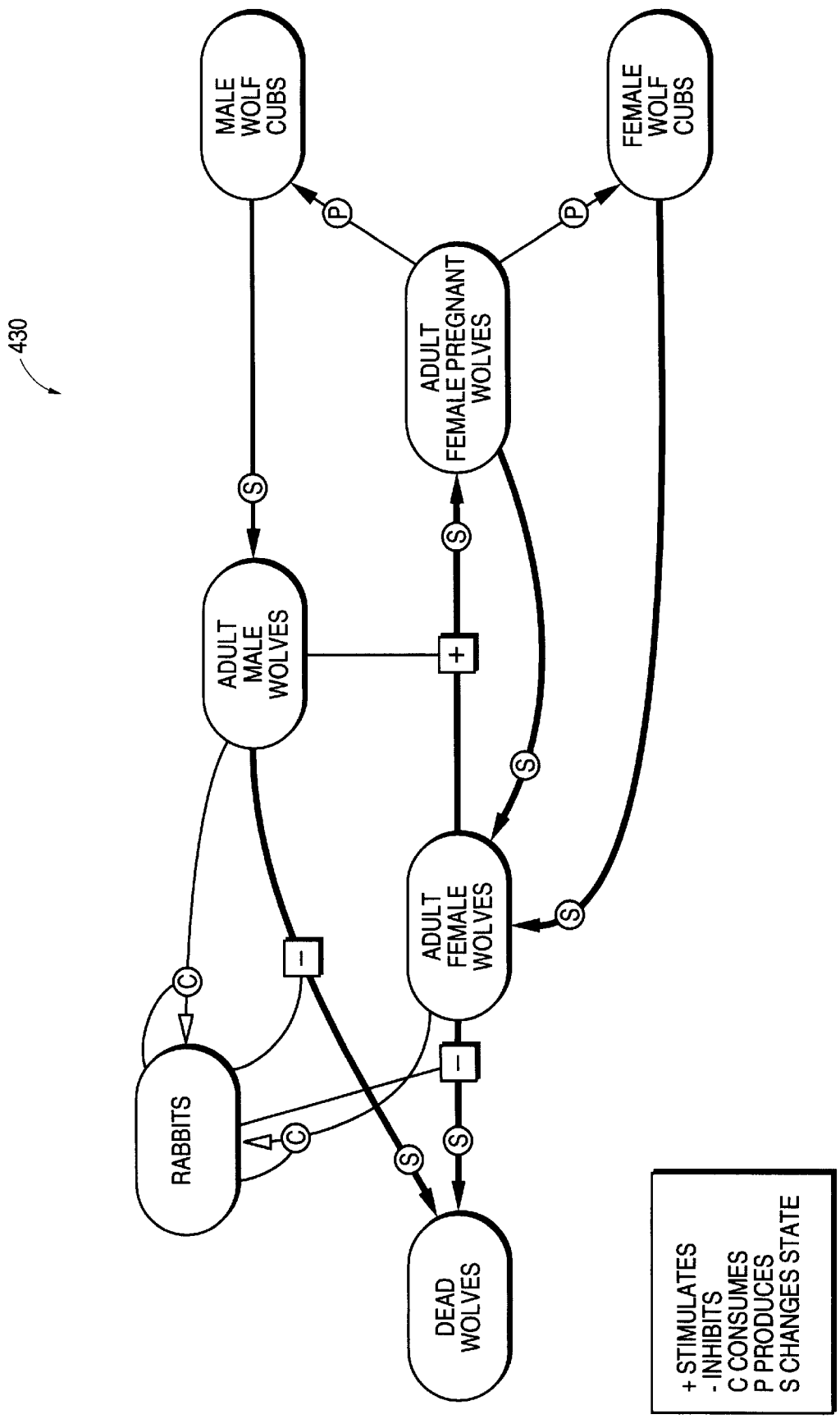
FIG. 22 illustrates an exemplary representation or display of a simulation model utilizing the graphical elements and notation illustrated in FIGS. 6–8.

FIG. 22 illustrates a further exemplary simulation model 430, which is constructed utilizing the graphical elements and notation illustrated in FIGS. 6–8, and which again models a predator-prey system. The functioning of the simulation model 430 can readily be ascertained utilizing the meanings attributed to the various graphical elements described above.

Figure 23:
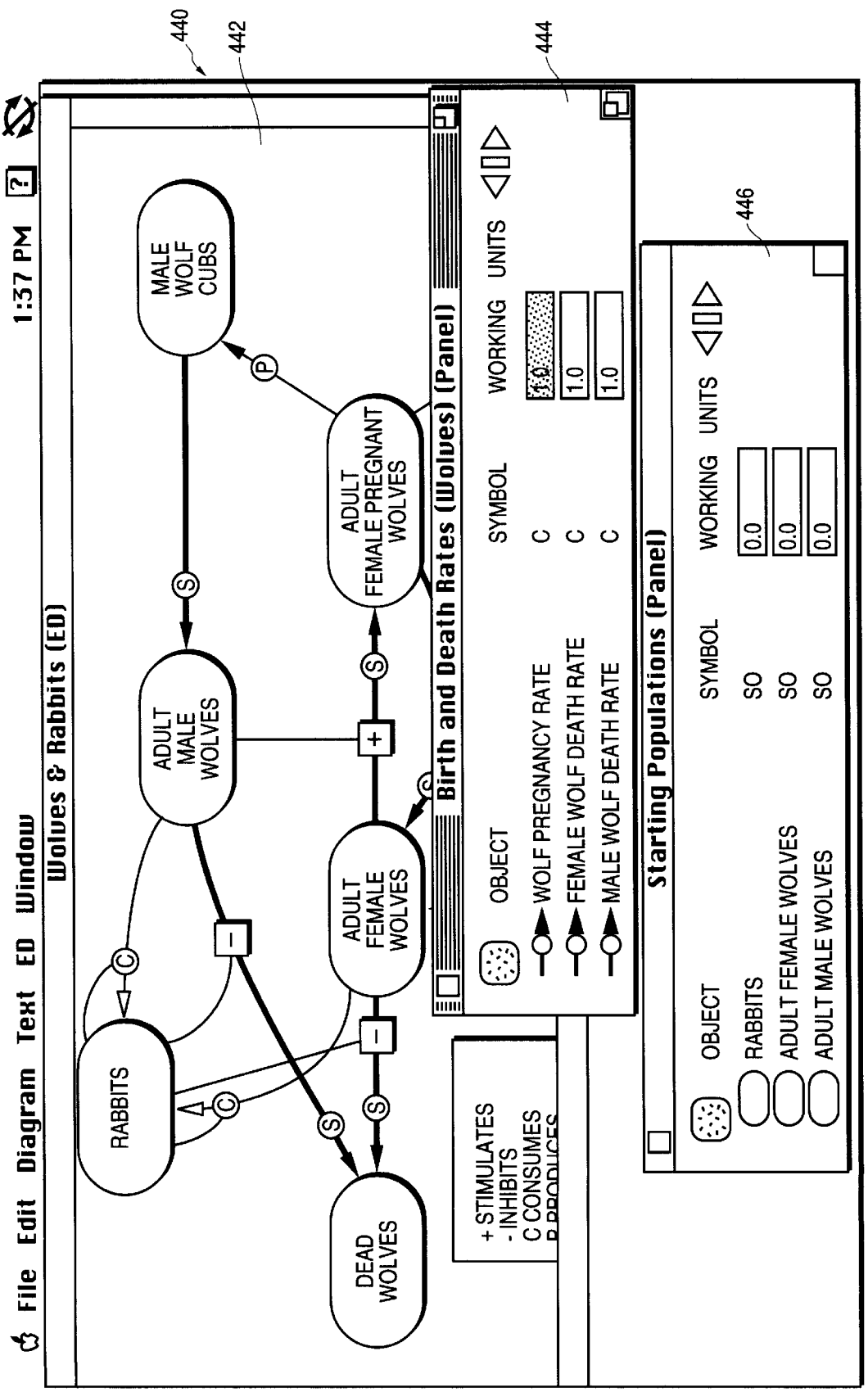
FIG. 23 illustrates a GUI including a diagram window and a pair of access panels according to one embodiment of the present invention.

FIG. 23 shows a GUI 440, which includes a diagram window 442 in which the simulation model 430 is displayed. The GUI 440 further comprises a first access panel 444, which includes parameter information and working values for parameters relating to the birth and death rates of the predators (i.e., wolves) within the simulation model 430. The access panel 444 is further shown to be in an active state. A second access panel 446 is shown to include parameter identification and working values for parameters relating to the starting populations of both predators and prey within the simulation model 430. The access panel 446 is further shown to be in an inactive state. It will be appreciated that by grouping the shown parameters in the respective access panels 444 and 446, access to, and viewing of, related parameter values is simplified and made convenient.

Figure 24:
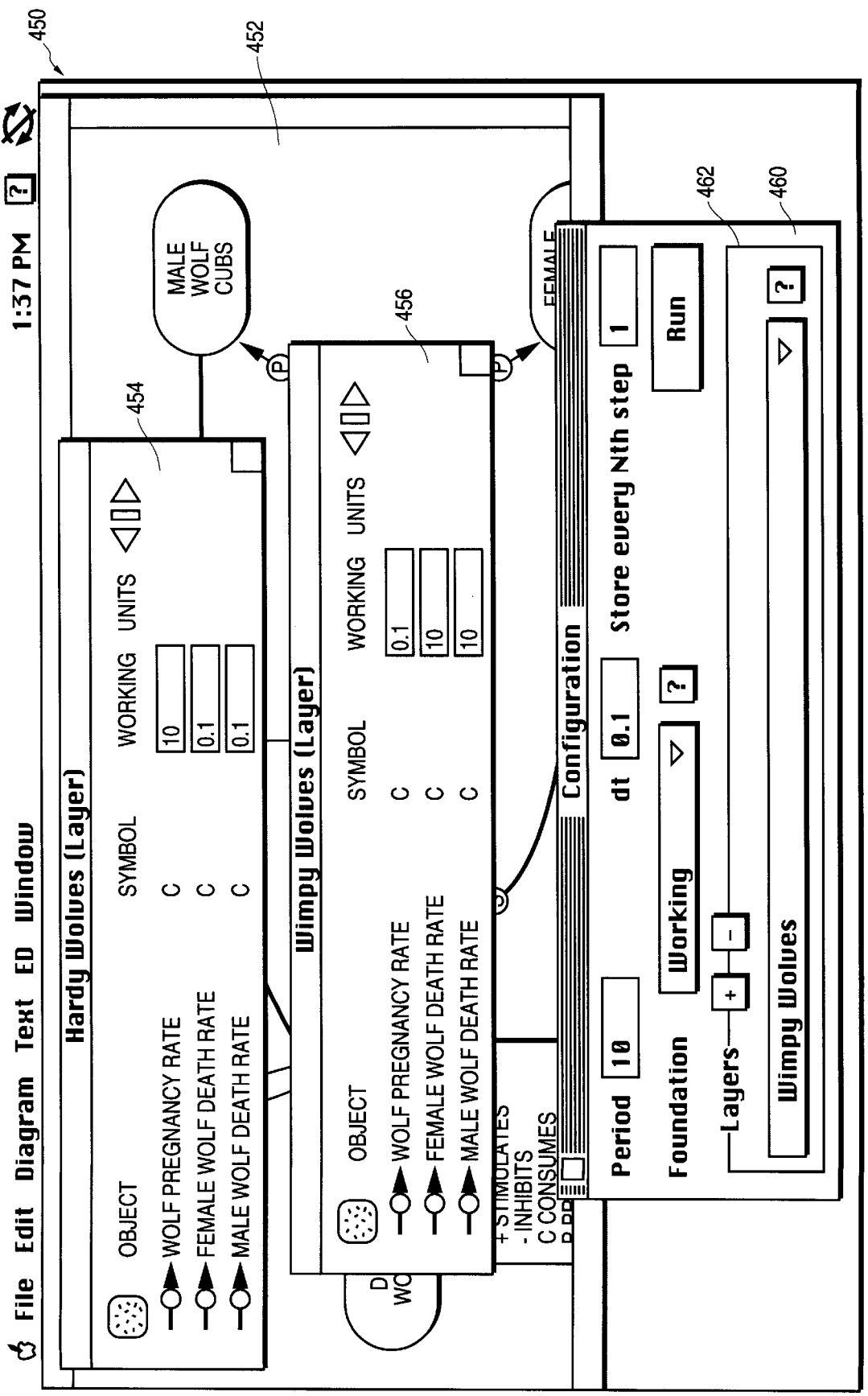
FIG. 24 illustrates a GUI, according to one embodiment of the present invention, including a diagram window, a pair of layer panels, and a configuration panel.

FIG. 24 shows GUI 450, which includes a diagram window 452 in which the simulation model 430 is again displayed. The GUI 450 includes a layer panel 454, which displays parameter identification information and layer values which characterize the predators within the simulation model 430 has being "hardy" wolves. The GUI 440 further includes a layer panel 456, which displays parameter identification information and layer values that characterize the predators within the simulation model 430 as being "wimpy" wolves. A configuration panel 460 is also included with the GUI 450, and contains a layer section 462, in which the layer represented by the layer panel 456 (i.e., the "wimpy" wolf layer) is shown as being the applied or selected layer. Accordingly, the layer values shown within the layer panel 456 will be attributed to the relevant parameters on performance of a simulation operation utilizing the simulation model 430.

Computer System

Figure 25:
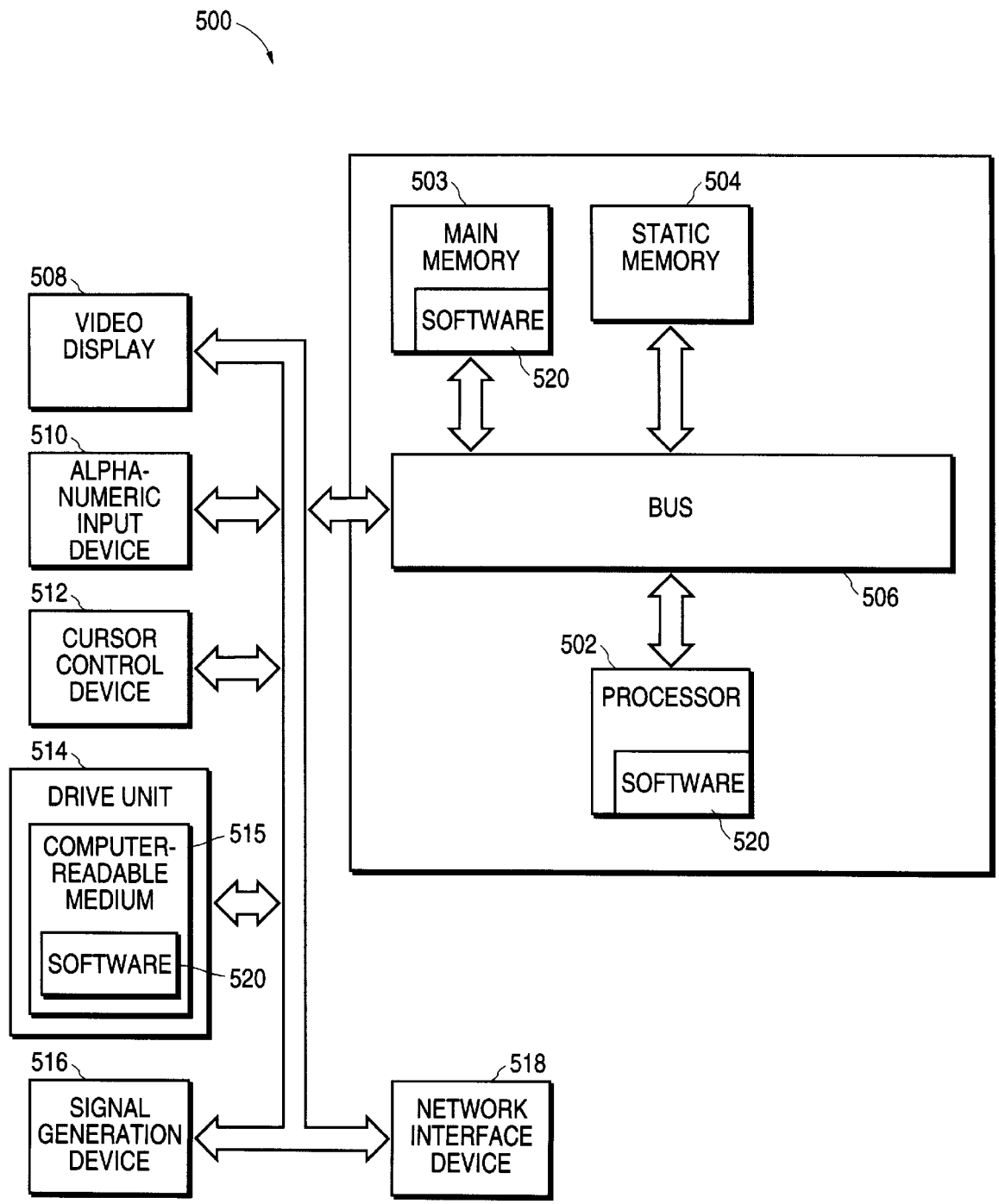
FIG. 25 is a diagrammatic representation of a computer system within which software, for performing the methodologies discussed above, may reside and be executed.

FIG. 25 shows a diagrammatic representation of a computer system 500 within which software for performing the methodologies discussed above, and for generating a GUI according to the teachings of the present invention, may operate. The computer system 500 includes a processor 502, a main memory 503 and a static memory 504, which communicate via a bus 506. This system 500 is further shown to include a video display unit 508 (e.g., a liquid crystal display (LCD) or a cathode ray tube (CRT)) on which a GUI according to the present invention may be displayed. The computer system 500 also includes an alpha-numeric input device 510 (e.g. a keyboard), a cursor control device 512 (e.g. a mouse), a disk drive unit 514, a signal generation device 516 (e.g. a speaker) and a network interface device 518. The disk drive unit 514 includes a computer-readable medium 515 on which software 520 for executing each methodology described above and for generating the various GUI elements comprising the invention is stored. The software 520 is also shown to reside, completely or at least partially, within the main memory 503 and/or within the processor 502. The software 520 may further be transmitted or received via the network interface device 518. For the purposes of this specification, the term "computer-readable medium" shall be taken to include any medium which is capable of storing or encoding a sequence of instructions for performing the methodologies of the present invention, and shall be taken to included, but not be limited to, optical and magnetic disks, and carrier wave signals.

Thus, a method of providing access to object parameters of a simulation model has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of providing access to object parameters of a simulation model, including multiple objects, via a graphical user interface, the method comprising:

displaying a diagram panel within a user interface, the diagram panel including respective graphical representations of objects of the simulation model;

displaying a first parameter panel within the user interface, the first parameter panel being distinct from the diagram panel;

detecting user selection of a set of object parameters for inclusion within the first parameter panel, the set of object parameters including object parameters associated with multiple objects of the simulation model;

in response to the user selection of the set of object parameters of the simulation model for inclusion in the first parameter panel, displaying an identifier for each object parameter of the set of object parameters within the first parameter panel to the exclusion of identifiers for object parameters not included within the set of object parameters;

receiving respective values for multiple object parameters of the set of object parameters, the respective values being inputted by a user via the first parameter panel; and assigning the respective values received via the first parameter panel to the multiple object parameters.

2. The method of claim 1 including performing a simulation utilizing the simulation model wherein the values assigned to the multiple object parameters are utilized as initial input values for the multiple object parameters.

3. The method of claim 1 including displaying a respective identifier for each of the multiple objects, from which the set of object parameters is selected, within the first parameter panel.

4. The method of claim 1 including detecting the user selection by detecting a drag-and-drop operation performed by a user on an identifier associated with at least a first object parameter of an object of the simulation model.

5. The method of claim 1 including defining a plurality of parameter panels within the user interface, detecting user selection of a set of object parameters for inclusion within each of the plurality of parameter panels, and displaying a respective identifier for each of the parameters of each of the sets of object parameters within a respective parameter panel of the plurality of parameter panels.

6. The method of claim 5 including identifying the first parameter panel as being in an active state in which the values, for the multiple object parameters included in the first access panel, are receivable via the first parameter panel, and identifying a second parameter panel as being in an inactive state in which values for further object parameters included within the second parameter panel, are not receivable via the second parameter panel.

7. The method of claim 6 including displaying a navigation icon within the first parameter panel, detecting a user selection of the navigation icon, and transferring the first parameter panel to an inactive state and transferring the second parameter panel to an active state in response to the user selection of the navigation icon.

8. The method of claim 6 including displaying a list icon within the first parameter panel, detecting user selection of the list icon, and displaying respective identifiers for the first and second parameter panels in response to the user selection of the list icon.

9. The method of claim 8 wherein the identifier for the first parameter panel indicates the first parameter panel as being in the active state.

10. The method of claim 8 including detecting a user selection of the identifier for the second parameter panel and placing the second parameter panel in an active state in response to the user selection.

11. The method of claim 1 including displaying a transfer icon within the first parameter panel, detecting a user selection of the transfer icon, and transferring the first and second object parameters in the first parameter panel to a second parameter panel in response to the user selection of the transfer icon.

12. A method of displaying parameters of a simulation model, including multiple objects, within a graphical user interface, the method comprising:

defining an access panel within the graphical user interface, the access panel being distinct from a diagram panel of the graphical user interface that includes graphical representations of objects of the simulation model;

selecting multiple object parameters of the simulation model for inclusion within the access panel, responsive to which an identifier for each of the multiple objects parameters is displayed within the access panel, the multiple object parameters including object parameters associated with multiple objects of the simulation model and the identifiers of the multiple object parameters being displayed to the exclusion of identifiers for object parameters that have not been selected for inclusion within the access panel; and inputting respective values for the multiple object parameters via the access panel, responsive to which the values are assigned to the multiple object parameters.

13. The method of claim 12 including initiating a simulation operation utilizing the simulation model inclusive of the values assigned to the multiple object parameters.

14. The method of claim 12 wherein user selection comprises dragging-and-dropping a respective parameter identifier associated with each of the multiple object parameters into the access panel.

15. A machine-readable medium having a sequence of instructions stored thereon which, when executed by a machine, cause the machine to perform the steps of:

displaying a diagram panel within a user interface, the diagram panel including respective graphical representations of multiple objects of a simulation model;

displaying a first access panel within the user interface, the first access panel being distinct from the diagram panel;

in response to a use identification of multiple object parameters of the multiple objects for inclusion within the first access panel, displaying an identifier for each of the multiple object parameters within the first access panel to the exclusion of identifiers for object parameters not identified by a user for inclusion with the first access panel;

receiving respective values for the multiple object parameters, the respective values being inputted by a user via the first access panel; and assigning the respective values received via the first access panel to the multiple object parameters.

16. Logic for displaying multiple object parameters of a simulation model within a graphical user interface, the logic comprising:

first display logic to display a diagram panel within the graphical user interface that includes graphical representations of objects of the simulation model, and to display a first parameter panel within the graphical user interface that is district from the diagram panel; and second display logic, in response to a user identification of multiple object parameters of the objects of the simulation model, to display an identifier for each of the multiple object parameters within the first parameter panel to the exclusion of identifiers for other object parameters not identified by a user for inclusion within the first parameter panel; and input logic to receive respective values for the multiple object parameters, the respective values being inputted by the user via the first parameter panel, and to assign the respective values to the multiple object parameters.

17. The logic of claim 16 including simulation logic to perform a simulation utilizing the simulation model wherein the values assigned to multiple first object parameters are utilized as initial input values for the multiple object parameters.

18. The logic of claim 16 wherein the second display logic displays a respective identifier fox each of multiple objects, associated with the multiple object parameters, within the first parameter panel.

19. The logic of claim 16 wherein the second display logic detects the user identification of the multiple object parameters by detecting a drag-and-drop operation performed by the user on respective identifiers associated with each of the multiple object parameters.

20. Apparatus for displaying multiple object parameters within a simulation model, the apparatus comprising:

first means for displaying a diagram panel within a user interface that includes graphical representations of objects of the simulation model, and for displaying a first parameter panel within the user interface that is distinct from the diagram panel;

second means, in response to a user identification of multiple object parameters of the objects of the simulation model, for displaying an identifier for each of the multiple object parameters within the first parameter panel to the exclusion of identifiers for other object parameters not identified by a user for inclusion within the first parameter panel; and third means for receiving respective values for the multiple object parameters, the respective values being inputted by the user via the first parameter panel, and for assigning the respective values to the multiple object parameters.

21. The apparatus of claim 20 including fourth means for performing a simulation utilizing the simulation model wherein the respective values assigned to the multiple object parameters are utilized as initial input values for the multiple object parameters.

22. The apparatus of claim 20 wherein the second means displays a respective identifier for each of the multiple objects, associated with the multiple object parameters, within the first parameter panel.

23. The apparatus of claim 20 wherein the second means detects the user identification of the multiple object parameters by detecting a drag-and-drop operation performed by the user on respective identifiers associated with each of the multiple object parameters.

24. A method of providing access to multiple object parameters of a simulation model, the method comprising:

displaying a diagram panel within a user interface on a display device, the diagram panel including graphical representations of multiple objects of the simulation model;

displaying a parameter panel within a user interface on the display device, the parameter panel being distinct from the diagram panel;

detecting user identification, via an input device, of multiple object parameters for inclusion within the parameter panel, the multiple object parameters including object parameters associated with multiple objects of the simulation model, in response to the user identification, via the input device, of the multiple object parameters of the multiple objects, displaying on the display device an identifier for each of the multiple object parameters within the parameter panel to the exclusion of identifiers for object parameters not identified by the user for inclusion within the parameter panel;

receiving user-inputted values for the multiple object parameters, the user inputted values being entered by the user into the parameter panel via the input device; and assigning the user-inputted values to the multiple object parameters within a computer memory.

25. A method of displaying parameters of a simulation model, including multiple objects, within a graphical user interface, the method comprising:

displaying a parameter panel within the graphical user interface as displayed on a display device, the parameter panel being distinct from a diagram panel that includes graphical representations of multiple objects of the simulation model and that is also displayed on the display device within the graphical user interface; and in response to a user selection of multiple object parameters of the multiple objects, displaying on the display device an identifier for each of the multiple object parameters within the parameter panel to the exclusion of identifiers for object parameters not identified by the user for inclusion within the parameter panel.

* * * * *